United States Patent
Dominessy et al.

(10) Patent No.: US 10,868,825 B1
(45) Date of Patent: Dec. 15, 2020

(54) CYBERSECURITY AND THREAT ASSESSMENT PLATFORM FOR COMPUTING ENVIRONMENTS

(71) Applicant: Architecture Technology Corporation, Minneapolis, MN (US)

(72) Inventors: Christopher Dominessy, Painted Post, NY (US); Scott Aloisio, Ithaca, NY (US); Robert A. Joyce, Ithaca, NY (US)

(73) Assignee: ARCHITECTURE TECHNOLOGY CORPORATION, Minneapolis, MN (US)

( * ) Notice: Subject to any disclaimer, the term of this patent is extended or adjusted under 35 U.S.C. 154(b) by 281 days.

(21) Appl. No.: 16/131,669

(22) Filed: Sep. 14, 2018

Related U.S. Application Data

(60) Provisional application No. 62/718,793, filed on Aug. 14, 2018.

(51) Int. Cl.
  *H04L 29/06* (2006.01)
  *H04L 12/26* (2006.01)

(52) U.S. Cl.
  CPC ........ *H04L 63/1433* (2013.01); *H04L 43/045* (2013.01); *H04L 43/06* (2013.01); *H04L 63/1441* (2013.01)

(58) Field of Classification Search
  CPC . H04L 63/1433; H04L 63/1441; H04L 43/06; H04L 43/045
  USPC ........................................................ 726/25
  See application file for complete search history.

(56) References Cited

U.S. PATENT DOCUMENTS

| | | |
|---|---|---|
| 5,974,549 A | 10/1999 | Golan |
| 7,496,959 B2 | 2/2009 | Adelstein et al. |
| 7,818,804 B2 | 10/2010 | Marceau |
| 7,962,961 B1 | 6/2011 | Griffin et al. |

(Continued)

FOREIGN PATENT DOCUMENTS

WO  2017105383 A1  6/2017

OTHER PUBLICATIONS

Henriques de Gusmao et al., "Cybersecurity risk analysis model using fault tree analysis and fuzzy decision theory," International Journal of Information Management, Jul. 20, 2018, 2 pp.

(Continued)

*Primary Examiner* — Kambiz Zand
*Assistant Examiner* — Benjamin A Kaplan
(74) *Attorney, Agent, or Firm* — Shumaker & Sieffert, P.A.

(57) ABSTRACT

An example network security and threat assessment system is configured to determine, based on one or more events that have occurred during execution of one or more applications, a potential security vulnerability of a target computing system, where the one or more events correspond to a node represented in the hierarchical risk model. The system is further configured to identify, based on a mapping of the node represented in the hierarchical risk model to a node represented in a hierarchical game tree model, one or more actions that are associated with the potential security vulnerability and that correspond to the node represented in the hierarchical game tree model, and to output, for display in a graphical user interface, a graphical representation of the potential security vulnerability and the one or more actions associated with the potential security vulnerability.

32 Claims, 15 Drawing Sheets

(56) References Cited

U.S. PATENT DOCUMENTS

| | | | |
|---|---|---|---|
| 8,156,483 | B2 | 4/2012 | Berg et al. |
| 8,296,848 | B1 | 10/2012 | Griffin et al. |
| 8,458,805 | B2 | 6/2013 | Adelstein et al. |
| 8,499,354 | B1 | 7/2013 | Satish et al. |
| 8,862,803 | B2 | 10/2014 | Powers et al. |
| 9,076,342 | B2 | 7/2015 | Brueckner et al. |
| 9,081,911 | B2 | 7/2015 | Powers et al. |
| 9,083,741 | B2 | 7/2015 | Powers |
| 9,384,677 | B2 | 7/2016 | Brueckner et al. |
| 2007/0297349 | A1* | 12/2007 | Arkin ............ H04L 12/66 370/255 |
| 2008/0114873 | A1* | 5/2008 | Chakravarty ....... G06F 11/3072 709/224 |
| 2010/0077075 | A1* | 3/2010 | Cuni ............ H04L 41/0233 709/224 |
| 2012/0210427 | A1 | 8/2012 | Bronner et al. |
| 2014/0337971 | A1 | 11/2014 | Casassa Mont et al. |
| 2015/0213260 | A1 | 6/2015 | Park |
| 2015/0339477 | A1 | 11/2015 | Abrams et al. |
| 2016/0099953 | A1 | 4/2016 | Hebert et al. |
| 2016/0234242 | A1 | 8/2016 | Knapp et al. |
| 2018/0048534 | A1 | 2/2018 | Banga et al. |
| 2018/0121657 | A1 | 5/2018 | Hay et al. |
| 2018/0191770 | A1 | 7/2018 | Nachenberg et al. |
| 2018/0367563 | A1 | 12/2018 | Pfleger de Aguiar et al. |
| 2018/0367593 | A1 | 12/2018 | Pfleger de Aquiar et al. |
| 2019/0014153 | A1 | 1/2019 | Lang et al. |
| 2019/0102564 | A1 | 4/2019 | Li et al. |
| 2019/0164015 | A1 | 5/2019 | Jones, Jr. et al. |
| 2019/0188615 | A1 | 6/2019 | Liu |
| 2019/0258953 | A1 | 8/2019 | Lang et al. |

OTHER PUBLICATIONS

Jones, "Software Defect Origins and Removal Methods," International Function Point Users Group, Dec. 28, 2012, 29 pp.

McHale, "The Aegis Combat System's continuous modernization," Military Embedded Systems, retrieved from http://mil-embedded.com/articles/the-aegis-combat-systems-continuous-modernization/, Aug. 26, 2016, 7 pp.

Rahman et al., "Defect Management Life Cycle Process for Software Quality Improvement," World Academy of Science, Engineering and Technology International Journal of Computer and Information Engineering, vol. 9, No. 12, Nov. 24, 2015, 4 pp.

Challagulla et al., "Empirical Assessment of Machine Learning based Software Defect Prediction Techniques," Proceedings of the 10th IEEE International Workshop on Object-Oriented Real-Time Dependable Systems (WORDS'05), Feb. 2-4, 2005, 8 pp.

Robbio, "How Will AI Impact Software Development?" Forbes Technology Council, Aug. 31, 2017, 4 pp.

U.S. Appl. No. 16/440,654, filed Jun. 13, 2019 by Joseph Sirianni et al.

Quinlan et al., "ROSE User Manual: A Tool for Building Source-to-Source Translators," Draft User Manual, Version 0.9.6a, Lawrence Livermore National Laboratory, Dec. 16, 2015, 339 pp.

Joyce et al., "MEGA: A Tool for Mac OS X Operating System and Application Forensics," Proceedings of the Digital Forensic Research Conference, Aug. 11-13, 2008, 9 pp.

Fisher, "Developing Software in a Multicore & Multiprocessor World," Klocwork.com., white paper, Sep. 2010, 9 pp.

Atighetchi et al., "Metrinome-Continuous Monitoring and Security Validation of Distributed Systems", Journal of Cyber Security and Information Systems vol. II, No. 1: Knowledge Management, Mar. 2014, 8 pgs.

Sironi et al., "Metronome" Operating System Level Performance Management via Self-Adaptive Computing, DAC 2012, Jun. 3-7, 2012, 10 pgs.

Vasiliadis et al., "GPU-asssisted malware", Int. J. Inf. Secur. (2015), Published Aug. 28, 2014, 9 pgs.

Balzarotti et al., "The impact of GPU-assisted malware on memory forensics: A case study", DFRWS 2015, 9 pgs. Applicant points out, in accordance with MPEP 609.04(a), that the year of publication, 2015, is sufficiently earlier than the effective U.S. filing date of the present application, so that the particular month of publication is not in issue.

Baloch et al., "Comparative Study of Risk Management in Centralized and Distributed Software Development Environment", Sci. Int.(Lahore),26(4),1523-1528, 2014, 6 pgs. Applicant points out, in accordance with MPEP 609.04(a), that the year of publication, 2014, is sufficiently earlier than the effective U.S. filing date of the present application, so that the particular month of publication is not in issue.

PR Newswire, "ATCorp Releases CSAS-Cloud Security Analysis Suite for Applications in the Cloud" Feb. 26, 2016, 2 pgs.

Wikipedia-OpenCL, Mar. 29, 2017, Retrieved from https://en.wikipedia.org/wiki/OpenCL, 15 pgs.

ROSE: Main Page, Mar. 29, 2017, Retrieved from http://rosecompiler.org/ROSE_HTML_Reference/, 3 pgs.

Schneier, "Attack Trees-Schneier on Security", Dr. Dobb's Journal, Dec. 1999, Retrieved from https://www.schneier.com/academic/archives/1999/12/attack_trees.html, 9 pgs.

Richard, "CERIAS: Memory Analysis, meet GPU Malware", Oct. 22, 2014, Retrieved from http://www.cerias.purdue.edu/news_and_events/events/security_seminar/details/index/popenihmencsf2v5mggg5ulfd4, 2 pgs.

2015 DFRWS Forensics Challenge-Submitted Solutions and Source Code Released, Retrieved from http://www.cs.uno.edu/~golden/gpu-malware-research.html, 5 pgs. Applicant points out, in accordance with MPEP 609.04(a), that the year of publication, 2015, is sufficiently earlier than the effective U.S. filing date of the present application, so that the particular month of publication is not in issue.

U.S. Appl. No. 15/485,784, filed Apr. 12, 2017 by Robert A. Joyce et al.

U.S. Appl. No. 15/622,434, filed Jun. 14, 2017 by Robert A. Joyce et al.

Becker et al., "Applying Game Theory to Analyze Attacks and Defenses in Virtual Coordinate Systems," 41st International Conference on Dependable Systems & Networks (DSN), Jun. 2011, 12 pp.

Shiva et al., "Game Theory for Cyber Security," Proceedings of the Sixth Annual Workshop on Cyber Security and Information Intelligence Research, Article No. 34, Apr. 2010, 5 pp.

"Cybersecurity," U.S. Department of Defense Instruction, No. 8500.01, Mar. 14, 2014, 59 pp, accessible via https://www.esd.whs.mil/Portals/54/Documents/DD/issuances/dodi/850001_2014.pdf.

"Cyberspace Operations," U.S. Air Force, Air Force Policy Directive 10-17, Jul. 31, 2012, 9 pp, accessible via https://fas.org/irp/doddir/usaf/afpd10-17.pdf.

Snyder et al., "Ensuring U.S. Air Force Operations During Cyber Attacks Against Combat Support Systems Guidance Where to Focus Mitigation Efforts," RAND Corporation, 2015, 36 pp.

Porche III et al., "A Cyberworm that Knows no Boundaries," RAND Corporation, 2011, 6 pp.

Libicki, "Cyberdeterrence and Cyberwar," Rand Corporation, 2009, 238 pp.

* cited by examiner

Test Details: CVE-2014-9367
NVD lookup

Overall Result: Fail (Requirements not Met; Attack is Possible)

Justification/Notes:

Tags: Add tag...

▼ Attributes and Computed Values
Data and fixed or dynamic values associated with this goal

| Name | Type/Function | Value |
|---|---|---|
| CVSS Score | Numeric | 4.3 |
| CVE: Access Vector | String | NETWORK |
| CVE: Access Complexity | String | MEDIUM |
| CVE: Authentication Required | String | NONE |
| CVE: Confidentiality Impact | String | NONE |
| CVE: Integrity Impact | String | PARTIAL |
| CVE: Availability Impact | String | NONE |

← 124

Test Result: Fail (Requirements not Met; Attack is Possible)
Test Time: Oct 1    2:50:39 PM
Vulnerability: CVE-2014-9367
CVSS Score: 4.3

Incomplete blacklist vulnerability in the urlEncode function in lib/TWiki.pm in TWiki 6.0.0 and 6.0.1 allows remote attackers to conduct cross-site scripting (XSS) attacks via a "'" (single quote) in the scope parameter to do/view/TWiki/WebSearch.

CYBERSECURITY AND THREAT ASSESSMENT PLATFORM FOR COMPUTING ENVIRONMENTS

This application claims the benefit of U.S. Provisional Application No. 62/718,793, filed Aug. 14, 2018, the entire contents of which are incorporated herein by reference.

STATEMENT REGARDING FEDERALLY SPONSORED RESEARCH OR DEVELOPMENT

This invention was made with Government support under contract FA8650-17-P-6841 awarded by the United States Air Force. The Government has certain rights in this invention.

BACKGROUND

Software assurance tools are often used to identify possible vulnerabilities or potentially malicious code in software systems, including Commercial Off-The-Shelf (COTS) software systems. Security may be put at risk by such vulnerabilities or malicious code in these systems. In addition, cyberattacks have become an increasingly significant problem and are difficult to address using traditional risk management strategies. Factors such as the immense size of cyberspace, the variety of forms of malware, and the ever-evolving nature of threats makes it difficult to create a quantitative decision framework.

Existing software assurance tools provide certain features, such as speed of operation and volume of coverage. However, these features come at the cost of limited breadth of scope and over specialization. Additionally, existing tools may identify lists of potential vulnerabilities that are largely incomplete (i.e., many false negatives).

SUMMARY

The present disclosure describes automated techniques (e.g., modeling and/or simulation techniques) for analyzing the effects of cybersecurity threats on a system or collection of systems. These techniques may provide a hierarchical modeling framework to describe the characteristics of an attack and a target system in question, thereby creating a model that can be used to describe possible interactions between attack systems and defense systems. The techniques may also provide cybersecurity analysis and management tools that identify and highlight impactful security concerns potentially before they become a problem. Game theory modeling and assessment techniques may provide valuable insights into attacker behavior and defender responses. Automatable test procedures may be augmented with risk analysis tools and visualization mechanisms to provide quantitative analysis of cybersecurity scenarios. By providing a general-purpose security assessment platform that combines cybersecurity defense methodologies with game theory simulation, one or more of the disclosed techniques provide an opportunity to identify and/or quantitatively measure cybersecurity risk in an automated, maintainable, and more efficient and effective manner.

In one example, a system includes a target computing system and a network security and threat assessment system. The network security and threat assessment system comprises one or more processors and a non-transitory computer-readable storage medium storing a first computer-readable data structure and a second computer-readable data structure, wherein the first computer-readable data structure represents a hierarchical risk model and includes a plurality of nodes that each correspond to events that may occur during execution of one or more applications on the target computing system, and wherein the second computer-readable data structure represents a hierarchical game tree model and includes a plurality of nodes that each correspond to actions that are associated with at least one potential security vulnerability of the target computing system. The one or more processors of the network security and threat assessment system are configured to: determine, based on one or more events that have occurred during execution of the one or more applications, a potential security vulnerability of the target computing system, wherein the one or more events correspond to a node represented in the hierarchical risk model; identify, based on a mapping of the node represented in the hierarchical risk model to a node represented in the hierarchical game tree model, one or more actions that are associated with the potential security vulnerability and that correspond to the node represented in the hierarchical game tree model; and output, for display in a graphical user interface, a graphical representation of the potential security vulnerability and the one or more actions associated with the potential security vulnerability.

In another example, a method includes generating, by a network security and threat assessment system comprising one or more processors, a first computer-readable data structure representing a hierarchical risk model, wherein the first computer-readable data structure includes a plurality of nodes that each correspond to one or more events that may occur during execution of one or more applications on a target computing system, and generating, by the network security and threat assessment system, a second computer-readable data structure representing a hierarchical action model, wherein the second computer-readable data structure includes a plurality of nodes that each correspond to one or more actions, and wherein the one or more actions are associated with one or more potential security vulnerabilities of the target computing system during execution of the one or more applications. The example method further includes mapping, by the network security and threat assessment system, at least a node of the first computer-readable data structure that represents the hierarchical risk model to at least a node of the second computer-readable data structure that represents the hierarchical action model, and receiving, by the network security and threat assessment system, test records of one or more tests associated with execution of the one or more applications on the target computing system, wherein the test records are assigned at least to the node of the first computer-readable data structure. The example method further includes, responsive to determining, based on the test records, that the one or more events corresponding at least to the node of the first computer-readable data structure have occurred: determining, by the network security and threat assessment system and based on the test records, a current operating state of the target computing system; determining, by the network security and threat assessment system, based on the hierarchical risk model and the current operating state of the target computing system, a potential security vulnerability of the target computing system; identifying, by the network security and threat assessment system, the one or more actions that correspond at least to the node of the second computer-readable data structure and that are associated with the potential security vulnerability of the target computing system; and outputting, by the network security and threat assessment system and for display in a graphical user interface, a graphical representation of the potential security vulnerability of the target computing system and a graphical representation of the one or more actions that are associated with the potential security vulnerability of the target computing system.

In another example, a non-transitory computer-readable storage medium stores instructions that, when executed, cause a computing system to perform operations. The operations include generating a first computer-readable data structure representing a hierarchical risk model, wherein the first computer-readable data structure includes a plurality of nodes that each correspond to one or more events that may occur during execution of one or more applications on a target computing system, and generating a second computer-readable data structure representing a hierarchical action model, wherein the second computer-readable data structure includes a plurality of nodes that each correspond to one or more actions, and wherein the one or more actions are associated with one or more potential security vulnerabilities of the target computing system during execution of the one or more applications. The operations further include mapping at least a node of the first computer-readable data structure that represents the hierarchical risk model to at least a node of the second computer-readable data structure that represents the hierarchical action model, and receiving test records of one or more tests associated with execution of the one or more applications on the target computing system, wherein the test records are assigned at least to the node of the first computer-readable data structure. The operations further include, responsive to determining, based on the test records, that the one or more events corresponding at least to the node of the first computer-readable data structure have occurred: determining, based on the test records, a current operating state of the target computing system; determining, based on the hierarchical risk model and the current operating state of the target computing system, a potential security vulnerability of the target computing system; identifying the one or more actions that correspond at least to the node of the second computer-readable data structure and that are associated with the potential security vulnerability of the target computing system; and outputting, for display in a graphical user interface, a graphical representation of the potential security vulnerability of the target computing system and a graphical representation of the one or more actions that are associated with the potential security vulnerability of the target computing system.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 8-12 are screen diagrams illustrating example information included in a risk model that may be output for display, in accordance with one or more aspects of the present disclosure.

DETAILED DESCRIPTION

Figure 1A:
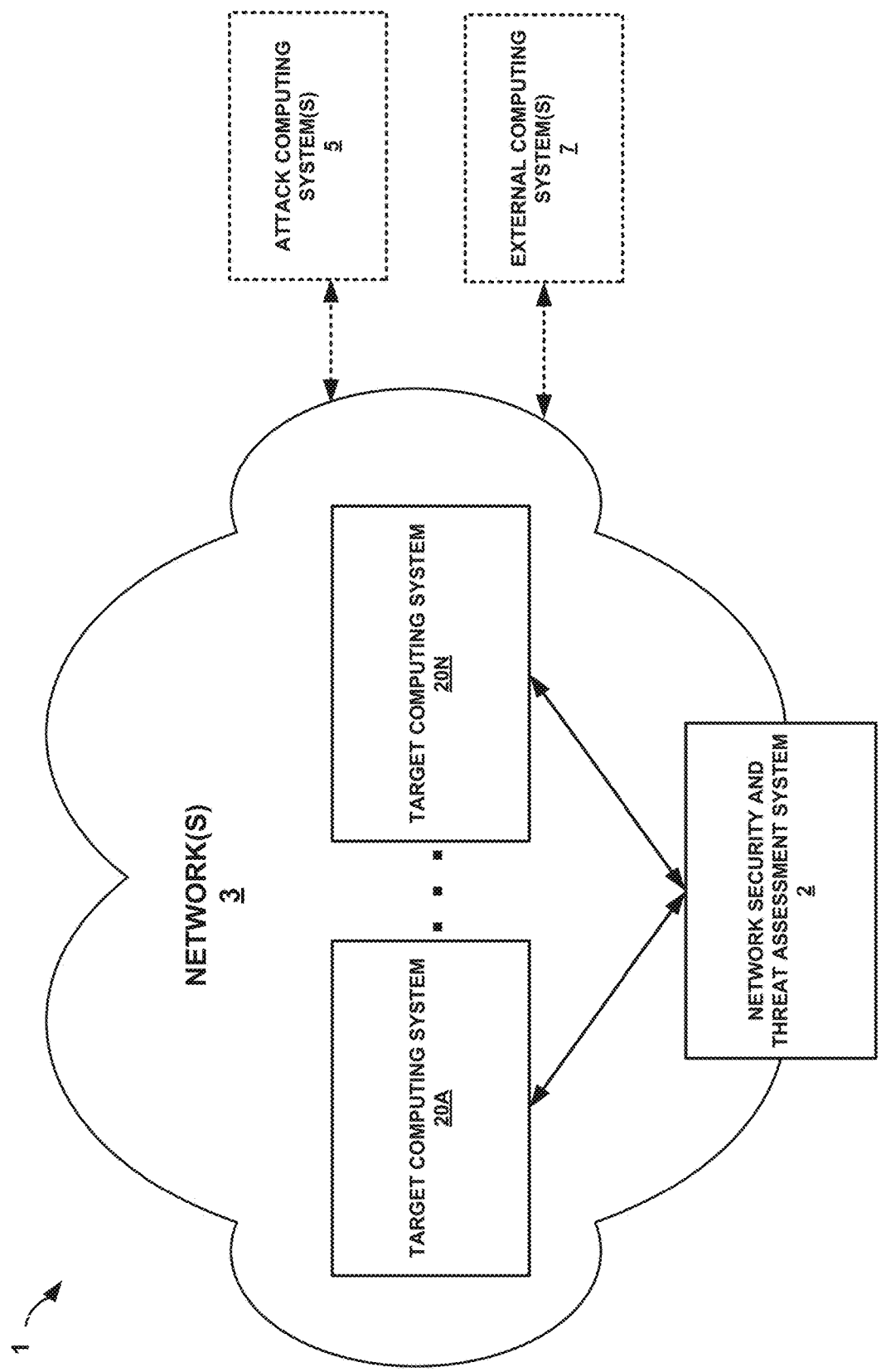
FIGS. 1A-1B are block diagrams illustrating examples of a network security and threat assessment system and target computing systems, in accordance with one or more aspects of the present disclosure.

As outlined above, cyberattacks have become an increasingly significant problem and are difficult to address using traditional risk management strategies. Factors such as the immense size of cyberspace, the variety of forms of malware, and the ever-evolving nature of threats makes it difficult to create a quantitative decision framework. Among the various factors contributing to the complexity of defending against cyberattacks are the variety and frequency of threats. Network attached devices and assets are increasingly accessible, lowering the bar for malicious actions taken from remote actors. Any device connected to the Internet, for example, offers an attacker a route that can be exploited to reach the attacker's objective. In many cases, defenders may need to take into account every access point to implement an adequate defense. If not, weak devices and network components can be exploited to circumnavigate a system's defenses. For example, a device such as a printer is easy to overlook but can provide an adequate avenue for attackers to penetrate defenses.

Cyber threats are also constantly evolving. As a result, installing new hardware or software always carries with it an inherit risk. New systems or upgrades could potentially have unknown flaws that can be exploited, while skipping security updates to these systems can be even more detrimental. Even legacy systems might have exploitable bugs that attackers have not yet identified or, even more concerning, bugs that been found and exploited but remain undetected. Thus, defensive technologies must often remain vigilant to protect against the most exploitable attacks.

Managing cybersecurity risk often involves close and continuous monitoring to stay ahead of well-resourced attackers. Defining security risks within complex systems is difficult to accomplish without a structured and maintainable approach. A wide variety of risk metrics can be maintained for each compute asset, though abundant data can quickly weaken maintainability of the attack surface. Storing, maintaining, and computing data from a vast collection of system metrics may result in a highly specialized environment for computing metrics and abstracting system assets.

These and other factors may make it quite difficult to quantify all the possible cyber threats. To compound the issue, a system is rarely self-sufficient; it often depends on other systems to perform tasks. Because of this, a successful cyberattack can have cascading repercussions on linked systems, intentionally or otherwise. Being able to quantify the effects of cyber warfare is one step in being able to identify routes that leave a network most vulnerable and decide where resources may be allocated in the event of an attack.

Game theory-based analysis may be implemented within the cybersecurity field. Using game theory assessment techniques and calculations, administrators and system maintainers can better adapt to the complex and adversarial cybersecurity landscape. Structured, hierarchical system modeling techniques can also define a wider attack surface, leading to better coverage from dangerous edge cases.

The present disclosure describes techniques (e.g., modeling and simulation techniques) for analyzing the potential effects of cyber warfare and cybersecurity threats on a system or collection of systems. These techniques may provide a hierarchical modeling framework to describe the characteristics of an attack and the system in question, thereby creating a model that can be used to describe possible interactions between attack systems and defense systems. The techniques may also provide cybersecurity analysis and management tools that identify and highlight impactful security concerns potentially before they become a problem. Generated models can, in certain examples, be used to run game theory-based simulations using a Graphical Processing Unit (GPU) to accelerate calculations, which inform statistical and game theory-based analysis tools to highlight noteworthy results. Game theory modeling and assessment techniques may provide valuable insights into attacker behavior and defender responses/responsive actions. Automatable test procedures may be augmented with risk analysis tools and visualization mechanisms to give quantitative analysis of cybersecurity scenarios. In certain examples, an analyst may utilize the disclosed tools and framework to build an attack tree model, configure it to run automated tests on a collection of target systems, and anticipate flaws in system configurations through detailed game theory-based modeling and analysis.

Various disclosed techniques may potentially benefit administration and maintenance of any complex set of high-value assets. As a general-purpose cybersecurity assessment platform that combines cybersecurity defense methodologies with game theory simulation, one or more of the disclosed techniques provide an opportunity to monitor and/or quantitatively measure cybersecurity risk in an automated, maintainable, and more efficient and effective manner. In various cases, the disclosed techniques may enable identification of vulnerabilities and potentially malicious code in a software system, and determination of possible risks that such vulnerabilities pose to overall mission success. These techniques may save time and money by providing a structured model of the target attack surface that is easy to improve and maintain. The techniques may be implemented on a variety of platforms that can remotely interface with deployed targets or systems, thereby potentially benefiting a variety of, e.g., commercial, enterprise, and research organizations.

By providing alerts in context, the present techniques enable an analyst to prioritize important changes and see the impact of potential vulnerabilities or malicious code. This prioritization may save time and effort, allowing the analyst to focus on the critical or cost-effective changes. The disclosed techniques may provide a high level of cybersecurity for the developer and security professional. The ability of the tools described herein to actively recognize potential malicious code and potential vulnerabilities as a system is developed may provide security throughout the software development lifecycle, which may significantly reduce costs. By finding potential vulnerabilities earlier in the lifecycle, rather than through problem reports after systems are fielded, sustainment costs can be reduced, and system readiness enhanced. The recognition of the potential for addressing potentially malicious attacks has far reaching benefit for security as well, given the high number of systems that now routinely incorporate various different types of hardware components in their architectures. In addition, the integration and use and game tree models along with attack tree models may enable improved identification of potential adversarial actions that may be performed on a target computing system given its current operating state, as well as identification of possible responsive actions or responses that may be performed in this operating state, in order to address, prevent, mitigate, and/or reduce the likelihood of occurrence or the impact of any such adversarial actions.

Figure 1B:
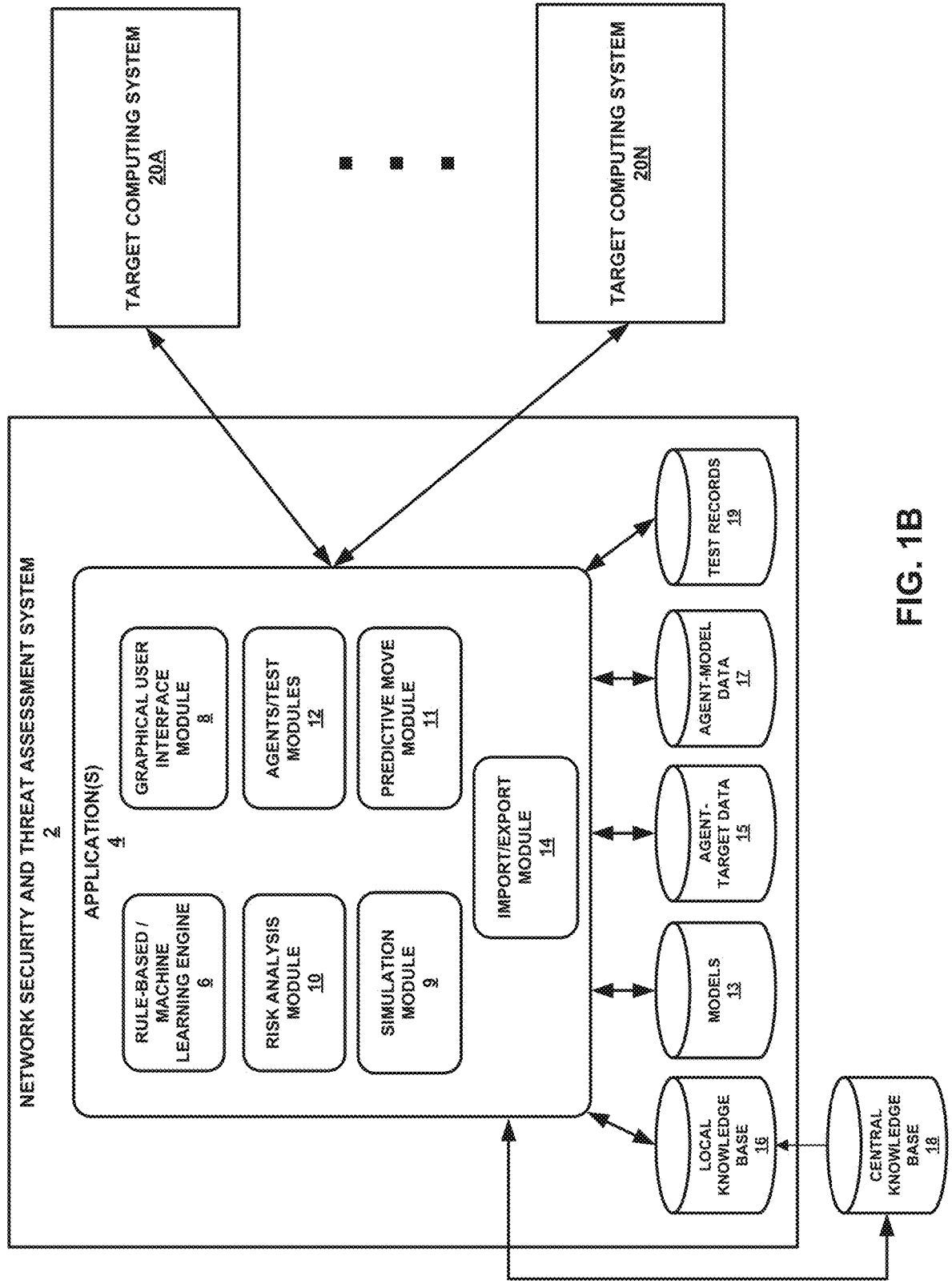

FIGS. 1A-1B are block diagrams illustrating examples of a network security and threat assessment system 2 and target computing systems 20A-20N, in accordance with one or more aspects of the present disclosure. As shown in FIG. 1A, a system 1 includes a network security and threat assessment system 2 that is communicatively coupled to one or more target computing systems 20A-20N (collectively, "target computing systems 20") within and/or via one or more networks 3 Networks 3 may include one or more wired and/or wireless networks. Network security and threat assessment system 2 is configured to execute one or more applications in order to analyze operation of target computing systems 20.

Network security and threat assessment system 2 may use multiple kinds of evaluations to generate an overall risk assessment for one or more of target computing systems 20. In some examples, target computing systems may comprise one or more remote or cloud systems. In some examples, one or more of target computing systems 20 and network security and threat assessment system 2 may be part of the same computing system or device. In some examples, one or more of target computing systems 20 may include one or more network elements. Using the techniques described herein, network security and threat assessment system 2 is capable of determining whether target computing systems 20 are being used securely.

As will be described further below, network security and threat assessment system 2 may execute one or more of applications to show analysis results in context within an overall risk model. In certain examples, one or more attack computing systems 5 and/or one or more external computing systems 7 may be communicatively coupled to target computing systems 20 via networks 3. Attack computing systems 5 may engage in one or more attacks against target computing systems 20. The applications of network security and threat assessment system 2 may provide a hierarchical modeling framework to describe the characteristics of an attack and the system in question, creating a model that can be used to describe possible interactions between attackers and defenders. Generated models can, in certain examples, be used to run game theory-based simulations, which inform statistical and game theory-based analysis tools to highlight noteworthy results. Game theory modeling and assessment techniques may provide valuable insights into attacker behavior and defender responses. In certain examples, network security and threat assessment system 2 may utilize the disclosed tools and framework provided herein to build at attack tree model, configure it to run automated tests on a collection of one or more of target computing systems 20, and anticipate flaws in system configurations through detailed game theory-based modeling and analysis.

For example, network security and threat assessment system 2 may determine, based on one or more events that have occurred during execution of one or more applications in target computing system 20A, a potential security vulnerability of target computing system 20A. These events may correspond to a node of an attack tree, as will be described in more detail below. Network security and threat assessment system 2 may also identify, based on a mapping of the node of the attack tree to a node of a game tree, one or more actions that are associated with the potential security vulnerability and that correspond to the node of the game tree. Network security and threat assessment system 2 may output, for display in a graphical user interface, a graphical representation of the potential security vulnerability and the one or more actions associated with the potential security vulnerability.

In some non-limiting examples, system 1 may comprise a virtual environment, and one or more of target computing systems 20, network security and threat assessment system 2, networks 3, attack systems 5, and/or external computing systems 7 may comprise one or more virtual systems. In some examples (e.g., for insider attacks), one or more of attack computing systems 5 may be part of or otherwise included in one or more of target computing systems 20.

FIG. 1B shows further details of one example of network security and threat assessment system 2 and target computing systems 20. Network security and threat assessment system 2 is configured to execute one or more applications 4 in order to analyze operation of target computing systems 20. Network security and threat assessment system 2 includes a local knowledge base 16, and it is also communicatively coupled to a central knowledge base 18, which may, in some cases, be remote from and external to network security and threat assessment system 2. Network security and threat assessment system 2 also includes models 13, agent-target data 15, agent-model data 17, and test records 19. As shown in FIG. 1B, and as will be described in further detail below, applications 4 may include a rule-based and/or machine learning engine 6, a graphical user interface module 8, a risk analysis module 10, one or more agents or test modules 12, a simulation module 9, a predictive move module 11, and an import/export module 14.

Network security and threat assessment system 2 may use multiple kinds of evaluations provided by risk analysis module 10 to generate an overall risk assessment for one or more of target computing systems 20, which may comprise one or more remote or cloud systems. The security models used and/or provided by risk analysis module 10 may, in some cases, incorporate design- and run-time evaluation from multiple sources, such as from agents/test modules 12. Using the techniques described herein, risk analysis module 10 is capable of determining whether other library and/or operating system API's of target computing systems 20 are being used securely. In certain cases, the functionality of rule-based/machine learning engine 6 may be incorporated or included within that of risk analysis module 10.

As will be described further below, network security and threat assessment system 2 may execute one or more of applications 4 to provide a software assurance tool showing analysis results in context within an overall risk model. The result may be a more cost effective and broad-scope software assurance that addresses modern software and hardware architectures. Applications 4 may provide a hierarchical modeling framework to describe the characteristics of an attack and the system in question, creating a model that can be used to describe possible interactions between attackers and defenders. Applications 4 may also provide cybersecurity analysis and management tools that identify and highlight impactful security concerns before they become a problem. Generated models can, in certain examples, be used to run game theory-based simulations (e.g., using a GPU to accelerate calculations), which inform statistical and game theory-based analysis tools to highlight noteworthy results. Game theory modeling and assessment techniques may provide valuable insights into attacker behavior and defender responses. In certain examples, an analyst may utilize the disclosed tools and framework provided by applications 4 to build at attack tree model, configure it to run automated tests on a collection of target systems, and anticipate flaws in system configurations through detailed game theory-based modeling and analysis.

Agents/test modules 12 may generally receive information associated with one or more applications that are executable on target computing systems 20, and agents/test modules 12 may, in some cases, receive monitoring information associated with execution of these one or more applications. For example, risk analysis module 10 may, in certain non-limiting examples, use function and/or API call stack data from target computing systems 20 (e.g., based on monitoring performed by agents/test modules 12 on target computing systems 20) as input to rule-based/machine learning engine 6 to discriminate normal, suspicious, and very likely malicious behavior of target computing systems 20. For example, based on the analysis or output of risk analysis module 10, a rule (e.g., rule implemented by an analyst or by risk analysis module 10) could identify a process that uses the GPU on target computing system 20A as a potentially malicious process if that process loads or is attempting to load a kernel module, given that typical processes using the GPU do not, in fact, load a kernel module. More sophisticated rules implemented by risk analysis module 10 can involve expected call stacks, where risk analysis module 10 may flag any unexpected sequence of calls or function call stacks during monitoring by agents/test modules 12 of one or more of target computing systems 20.

In addition to rules or policies that may be implemented by rule-based/machine learning engine 6, rule-based/machine learning engine 6 may also utilize one or more machine-learning models and/or machines (e.g., Classification and Regression Tree (CART) models and/or Support Vector Machines (SVM's)) to, e.g., "learn" what normal sequences of function or API calls are typical for software (e.g., GPU-assisted software) executing on target computing systems 20 (e.g., based on known benign and non-benign function call flows). Based on the known sequences of typical versus atypical call flows or sequences, rule-based/machine learning engine 6 may identify a respective likelihood of occurrence of each of one or more potential vulnerabilities. For instances, as a non-limiting example, rule-based/machine learning engine 6 may then flag abnormal sequences or call stacks based on known or learned typical sequences/call stacks versus atypical sequences/call stacks. As one example, rule-based/machine learning engine 6 may flag an API call to start GPU-specific code in response to a network request that should not typically involve the GPU.

Applications 4 may provide functionality of an automated software assurance assessment tool that is capable of detecting threats in modern runtime systems, such as target computing systems 20. One or more of target computing systems 20 may include multi-core processors, distributed/cloud systems, and/or virtual machine hypervisors. In many cases, one or more of target computing systems 20 may provide a heterogeneous hardware environment that includes different types of hardware components (e.g., accelerators, processing units), such as GPU's and/or FPGA's. Applications 4 are configured to detect threats due to malware that is introduced on target computing systems 20. For example, applications 4 may utilize agents/test modules 12 to tracks all access to a particular GPU (e.g., a GPU included in target computing system 20A) by hooking the only available API's by which code can run on this GPU, and using risk analysis module 10 and/or rule-based/machine learning engine 6 to examine how the API's and GPU are being used. Agents/test modules 12 may also, in some cases, be configured to execute commands directly on one or more of target computing systems 20 using a secure shell.

In addition, applications 4 are configured to recognize threats that may arise due to the interaction of components in target computing systems 20, such as the unsafe use of API's or re-using benign libraries for malicious purposes. As noted above, agents/test modules 12 may receive data from target computing systems 20, which may, in some non-limiting cases, implement function and/or API hooking techniques, and provide such data to risk analysis module 10 for analysis in identifying potential issues related to malware (e.g., GPU-assisted malware). The function and/or API hooking techniques may apply directly to other library or framework API's of target computing systems 20. Through use of risk analysis module 10 and rule-based/machine learning engine 6, applications 4 also attempt to minimize the identification of false positives regarding potential risks or threats to target computing systems 20, while at the same time identifying potentially critical vulnerabilities or malicious code that is executing on target computing systems 20. Rule-based/machine learning engine 6 may, in various cases, apply multiple, weighted analysis techniques to raw data that is provided by agents/test modules 12 in response to the active monitoring of target computing systems 2. Furthermore, although source code for executables operating on target computing systems 20 may not always be available, applications 20 may utilize binary function-hooking technology, as well as system configuration tests, external probes, and other tools (e.g., tools provided by agents/test modules 12), as described further below.

As will be described in further detail below, applications 4 may also include a simulation module 9 and a predictive move module 11. Simulation module 9 is capable of configuring, initiating, monitoring, and modifying one or more simulated actions that are performed on one or more of target computing systems 20. For example, simulation module 9 may execute a simulated attack against a target (e.g., one of target computing systems 20), and agents/test modules 12 may be configured to gather test data from the target during or after the simulated attack. As a result, risk analysis module 10 may utilize the techniques described herein to assess the effect of the simulated attack against the target.

Predictive move module 11 may be configured to provide predicted adversarial actions that may potentially be performed against a target based on its current operating state response to one or events (e.g., events associated with an attack against the target). For example, during or after an attack or a simulated attack against the target, risk analysis module 10 may analyze results of tests performed by agents/test modules 12 and determine a current operating state of the target, and potential associated vulnerabilities. Predictive move module 11 may utilize an attack tree and/or a game tree to identify associated adversarial actions that may be performed against the target in this state, as well as predicted remediations or responses/responsive actions that may be performed on the target to address, mitigate, or present any such adversarial actions. Simulation module 9 and predictive move module 11 are described in further detail below.

As noted previously, target computing systems 20 may, in non-limiting examples, comprise heterogeneous computing environments in which different types of hardware components are used, including non-central processing unit (CPU) accelerators such as GPU's and FPGA's. In some examples, one or more of target computing systems 20 may comprise one or more virtual environments or computing systems that include one or more virtual system assets. For example, the virtual system assets may include one or more cyber range devices, networks, and/or other virtual environments, including development environments. As a result, applications 4 may enable network security and threat assessment system 2 to integrate with such virtual environments, enabling various different types of attacks to be performed on target computing systems 20, including artificial or simulated attacks. This may facilitate improved testing and development procedures with respect to cybersecurity. In some examples, network security and threat assessment system 2 may also comprise one or more virtual environments or computing systems.

In some cases, graphical user interface module 8 may enable the visualization of the network topology of one or more of target computing systems 20 through asset graphs, and this may enable the creation of a streamlined process for incorporating asset lists such as configuration management databases (CMDB) as targets (e.g., one or more of target computing systems). Separating target resources from test procedure configuration via applications 4 (e.g., using agents/test modules 12) may enable greater freedom to model and simulate the underlying environment of one or more of target computing systems 20. The data model that represents a target environment may include network links to connected components and assets. Using a pre-configured or initialized resource model may enable tests to more easily be attributed to targets. Users may, for example, simply assign targets to test procedures (e.g., via graphical user interface module 8, agents/test modules 12), instead of configuring targets for every test procedure. For example, an identifier of the target and an identifier of an automated test procedure or test agent may be both assigned to a particular node or nodes of a tree (e.g., attack tree and/or game tree).

Integrating with the target environment provides additional potential for low-overhead simulation scenarios. Instead of implementing computationally and labor intensive virtual environments, attack behaviors on the target environment can be simulated by defining attack scenarios. The attack scenario is a sequence of simulated attacker moves that give the appearance of an ongoing attack. Simulated attack scenarios provide a low-cost methodology for preparing and protecting against attacks. This type of simulated attack scenario may be integrated into the resource data model.

In certain examples, graphical user interface module 8 may provide components to visualize the target environment provided by target computing systems 20. The target environment may be shown as a graph of target resources, connected by edges that show network connections or other communication channels. Beyond cybersecurity awareness, the use of an asset graph is useful in maintaining and planning deployment environments. It may also be useful in providing a visualization of risk to the target in a very direct and understandable way.

The use of the software components included in applications 4 may enable clear, low-overhead, and effective communication of quantitative status and risk information to users of network security and threat assessment system 2 regarding the target environment. Not only will network security and threat assessment system 2 be useful to system analysts and cybersecurity experts, but also to non-technical staff and employees in training. The implemented techniques may achieve lower management overhead, more precise management of target resources, and improved safety assurances.

Figure 5:
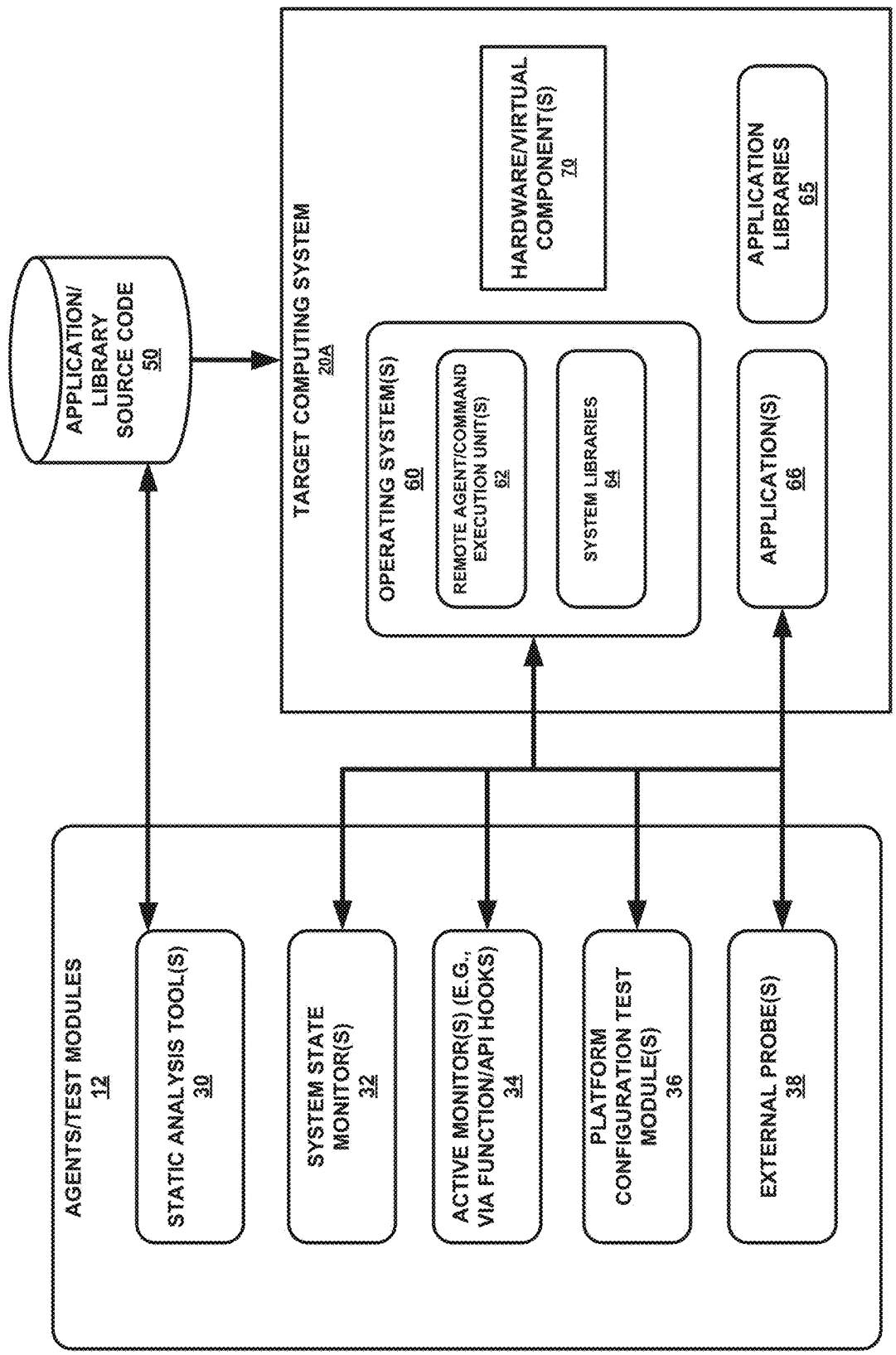
FIG. 5 is a block diagram illustrating one example of various components shown in FIG. 1B, in accordance with one or more aspects of the present disclosure.

In many instances, applications 4 utilize agents/test modules 12 to perform both passive and active monitoring of target computing systems 20. For example, as shown in FIG. 5, agent/test modules 12 may include static analysis tools, system state monitors, active monitors, platform configuration test modules, and external probes. The static analysis tools are operable to analyze any available application or library source code for processes that are executable on target computing systems 20. The system state monitors are operable to perform monitoring or tests of system state information on target computing systems 20, such as information related to file system changes or particular programs that are or are not running on computing systems 20 at a particular point in time. These system state monitors typically monitor system-level state information, as opposed to information that is specific to a particular type of component (e.g., hardware accelerator). In some cases, these system state monitors may invoke remote agents or commands that are executed on target computing systems 20. These remote agents or commands may, upon execution on target computing systems 20, provide system state information back to the system state monitors on network security and threat assessment system 2. As one non-limiting example, the system state monitors may remotely collect such information from target computing systems 20 as outlined in U.S. Patent Application Publication No. 2012/0210427 by Bronner et al., published on Aug. 16, 2012 and entitled "Configurable Investigative Tool," which is incorporated by reference herein in its entirety.

In certain non-limiting examples, the active monitors utilized by agents/test modules 12 may gather information from function and/or API hooking modules that are specific to particular functions and/or API's used during execution of instructions on target computing systems 20. These hooking modules or other active monitors are configured to obtain runtime information that is associated with instruction execution on target computing systems 20. As one example, the hooking modules may gather information associated with system memory, intercepted system calls, execution state, and/or stack traces that are associated with processes executing on target computing systems 20.

The platform configuration test modules included in agents/test modules 12 may identify configuration information associated with target computing systems 20. This configuration information may include security settings, user account information, or permission information associated with processes executing on target computing systems 20.

As shown in FIG. 1B, applications 4 may also receive information from local knowledge base 16 and central knowledge base 18 using import/export module 14. Local knowledge base 16 may be local to, and stored on, network security and threat assessment system 2. Central knowledge base 18 may be remote from, and stored external to, network security and threat assessment system 2. Central knowledge base 18 may include information associated with common vulnerabilities to computing systems and/or known attacks that may be initiated against such systems. Much of the information included in central knowledge base 18 may include vendor- or community provided data, or standards-related data, which is continuously updated over time as more information becomes available.

In some instances, the information stored in central knowledge base 18 may also be stored or copied into local knowledge base 16 of network security and threat assessment system 2 via import/export module 14. Local knowledge base 16 may also include policy information associated with rules as to which operations may or may not be performed by a given system, such as one or more of target computing systems 20.

Import/export module 14 may import the information contained in local knowledge base 16 and/or central knowledge base 18, and may provide such information to risk analysis module 10 for use in risk modeling and analysis operations. Risk analysis module 10 also utilizes the information provided by agents/test modules 12 based on the monitoring of target computing systems 20. Using the information provided by import/export module 14 and agents/test modules 12, risk analysis module 10 is capable of performing risk modeling and analysis operations to identify any potential vulnerabilities, risks, or malicious code (e.g., malware) associated with execution of processes in target computing systems 20. Risk analysis module 10 may utilize graphical user interface module 8 to provide a graphical representation of such vulnerabilities and risks within a graphical user interface that is output to a user (e.g., analyst). Based on the output provided by graphical user interface module 8, a user may determine what corrective or preventive actions to take in the software development process (e.g., modifying code or configuration information to mitigate or eliminate such vulnerabilities or risks).

In addition, risk analysis module 10 may utilize rule-based/machine learning engine 6 to identify trends of typical and atypical sequences of states or function/API calls (e.g., call flows) during process execution on target computing systems 20, such that risk analysis module 10 is capable of distinguishing benign from potentially malicious code that is executing on target computing systems 20. In such fashion, risk analysis module 10 is operable to identify potential vulnerabilities or risks that may be output for display by graphical user interface module. Import/export module 14 may also output information generated by risk analysis module 10 and/or rule-based/machine learning engine 6 for storage in local knowledge base 16 and/or central knowledge base 18 for later use by applications 4.

In some examples, network security and threat assessment system 2 may use agents/test modules 12 to monitor execution of one or more applications on a target computing system, such as target computing system 20A. Target computing system 20A executes one or more applications and includes a plurality of processing units. The processing units are operable to perform one or more operations during execution of the one or more applications on target computing system 20A. In some cases, the processing units may include at least one GPU that is operable to perform at least one of the one or more operations.

During execution of the one or more applications on target computing system 20A, network security and threat assessment system 2 may, in non-limiting examples, use agents/test modules 12 to receive, from target computing system 20A, monitoring information that includes at least one of function call data or API call data associated with operations performed by the processing units during execution of the one or more applications on target computing system 20A. Network security and threat assessment system 2 may then use risk analysis module 10 to import the monitoring information into a risk model included in models 13, such as a hierarchical risk model described herein and stored on network security and threat assessment system 2. Network security and threat assessment system 2 uses risk analysis module 10 to analyze the monitoring information within the risk model of models 13 to determine one or more potential vulnerabilities (e.g., risks, threats) and one or more potential impacts of the one or more potential vulnerabilities in the target computing system, where the one or more potential vulnerabilities are associated with execution of the one or more applications on target computing system 20A. In some cases, risk analysis module 10 may utilize rule-based/machine learning engine 6 to assist with its analysis of the monitoring information and identification of possible vulnerabilities and vulnerability impacts, as described in further detail below. As will be described in further detail below, models 13 may include a risk model (e.g., attack tree) and also an action model (e.g., game tree).

Network security and threat assessment system 2 may use graphical user interface module 8 to display, in a graphical user interface, a graphical representation of the one or more potential vulnerabilities and the one or more impacts within risk model 13 that are identified by risk analysis module 10. In some cases, the graphical representation may include corresponding scores or severities associated with the potential vulnerabilities and/or potential impacts, alerting a user as to which vulnerabilities and/or vulnerability impacts may be the most severe or complex. In some examples, the data representing models 13 is stored as Extensible Markup Language (XML) data. Risk analysis module 10 may configure GUI module 8 to use the data representing risk model 18 to output a graphical user interface (GUI) based on risk model 18.

In accordance with techniques of this disclosure, risk model 18 may comprise a plurality of tree nodes organized as a tree, which may include one or more root nodes and one or more sub-nodes of any respective root node. Within the tree structure, any sub-node may also serve as a parent node to other further sub-nodes (e.g., children nodes) associated with the respective sub-node. Each tree node of the tree may correspond to an event that may occur in target computing systems 20, and may represent one or more potential security vulnerabilities associated with a particular target system. For each respective non-leaf tree node of risk model 18, the events corresponding to child tree nodes of the respective non-leaf tree node may be preconditions of the event corresponding to the respective non-leaf tree node. For example, a particular tree node of risk model 18 may correspond to a failure of a system node in one or more of target computing systems 20 not sending data. In this example, a first child tree node (e.g., sub-node) of the particular tree node may correspond to the system node not being powered on; a second child tree node of the particular tree node may correspond to a network interface controller (NIC) of the system node not being properly configured; a third child tree node of the particular tree node may correspond to there being insufficient bandwidth to send data from the system node, and so on.

In these non-limiting examples, the events corresponding to child tree nodes of a given tree node in risk model 18 may be conjunctive or disjunctive for the occurrence of the event corresponding to the given tree node. In instances where events corresponding to child tree nodes of the given tree node are conjunctive, all events corresponding to the child tree nodes must be met in order for the event corresponding to the given tree node to occur. For example, an event corresponding to a first child tree node of the given tree node and an event corresponding to a second child tree node of the given tree node may both need to occur for the event corresponding to the given tree node to occur. In instances where events corresponding to child tree nodes of the given tree node are disjunctive, only one or more of the events corresponding to the child tree nodes must be met. For example, either an event corresponding to a first child tree node of the given tree node or an event corresponding to a second child tree node of the given tree node may be sufficient for occurrence of the event corresponding to the given tree node.

In some examples, leaf tree nodes may correspond to events that may occur because of a vulnerability in one or more of target computing systems 20. For example, an attacker might break an encryption code protecting passwords. In this example, an attacker breaking an encryption code protecting passwords may be an event corresponding to a leaf tree node of a risk model. Therefore, the risk model included in models 13 may illustrate how vulnerabilities can lead to possible root-level events, such as how an attacker may exploit a vulnerability to achieve the attacker's possible aims. In various examples, the tree may be an attack tree, and each of the tree nodes may be associated with a goal or sub-goal of an attack. Parent tree nodes may be associated with higher-level attack goals, which child tree nodes may be associated with lower-level sub-goals. Certain nodes in the tree may be both a parent node and a child node with respect to other nodes in the tree.

In some examples, applications 4 may receive data representing all or portions of risk model 18 from import/export module 14 or another source. Import/export module 14 may receive such data from another computing device or computer-readable storage media. Moreover, import/export module 14 may export data representing risk model 18. In some examples, import/export module 14 may export or import data representing risk model 18 using a version control system. Furthermore, in some examples, GUI module 8 may output, for display, a risk model comparison interface for comparing changes in versions of risk models.

GUI module 8 may receive, via the agent-target interface, indications of user input to associate test agents with targets (e.g., target system nodes or target groups) in target computing systems 20. In other words, a user may use the agent-target interface to associate agents/test modules 12 with system nodes or target groups. Based on the indications of user input, GUI module 8 may generate data associating a test agent with a target (e.g., agent-target data 15). Agent-target data 15 may be in the form of XML data, relational database data, or data structured in another manner, according to various examples.

Risk analysis module 10 may instruct particular agents/test modules 12 to gather data from particular targets. For example, agent-target data 15 may indicate that a test agent A of applications 4 is associated with a target B in target computing systems 20. Hence, in this example, risk analysis module 10 may instruct test agent A to gather data from target B.

In some examples, GUI module 8 may output, for display on a display device (e.g., a display device of network security and threat assessment system 2), an agent-model interface. GUI module 8 may receive, via the agent-model interface, indications of user input to associate agents/test modules 12 with tree nodes of risk model 18. In other words, a user may use agent-model interface to associate agents/test modules 12 with tree nodes of risk model 18. Based on the indications of user input, GUI module 8 may generate data associating an agent/test module with a tree node of risk model 18 (e.g., agent-model data 17).

Import/export module 14 may generate test records 19 based on data generated by agents/test modules 12. In some examples, import/export module 14 may store test records 19 in files in a file system, such as a local file system. For instance, in some examples, import/export module 14 may generate test records 19 in XML-based files.

In FIG. 1B, network security and threat assessment system 2 and target computing systems 20 are shown are separate systems that are external from one another. In some examples, network security and threat assessment system 2 may be included in or otherwise part of, one or more of target computing systems 20. In other words, the functionality described herein with respect to network security and threat assessment system 2 may be included in or provided by one or more of target computing systems 20 (e.g., target computing system 20A, target computing system 20N). In addition, in certain examples, network security and threat assessment system 2 and/or one or more of target computing systems 20 may comprise one or more virtual components (e.g., virtual machines) within a virtual environment.

According to one or more examples, and as will be described in further detail below, network security and threat assessment system 2 (e.g., using one or more of applications 4 executing on network security and threat assessment system 2, such as one or more of risk analysis module 10, rule-based/machine learning engine 6, predictive move module 11, and/or simulation module 9) may generate a first computer-readable data structure representing a hierarchical risk model (e.g., attack tree), where the first computer-readable data structure includes nodes that each correspond to one or more events that may occur during execution of one or more applications on a target computing system (e.g., target computing system 20A). Network security and threat assessment system 2 may also generate a second computer-readable data structure representing a hierarchical action model (e.g., game tree), where the second computer-readable data structure includes nodes that each correspond to one or more actions, and where the one or more actions are associated with one or more potential security vulnerabilities of target computing system 20A during execution of the one or more applications.

Network security and threat assessment system 2 may map at least a node of the first computer-readable data structure that represents the hierarchical risk model to at least a node of the second computer-readable data structure that represents the hierarchical action model. Network security and threat assessment system 2 may receive test records of one or more tests associated with execution of the one or more applications on target computing system 20A, such as tests that are configured by agents/test modules 12 for implementation on target computing system 20A. The test records are assigned at least to the node of the first computer-readable data structure.

Responsive to determining, based on the test records, that the one or more events corresponding at least to the node of the first computer-readable data structure have occurred, network security and threat assessment system 2 may determine, based on the test records, a current operating state of target computing system 20A, and determine, based on the hierarchical risk model and the current operating state of target computing system 20A, a potential security vulnerability of target computing system 20A. Network security and threat assessment system 2 may also identify the one or more actions that correspond at least to the node of the second computer-readable data structure and that are associated with the potential security vulnerability of target computing system 20A. Network security and threat assessment system 2 may also output (e.g., using graphical user interface module 8), for display in a graphical user interface, a graphical representation of the potential security vulnerability of target computing system 20A and a graphical representation of the one or more actions that are associated with the potential security vulnerability of target computing system 20A.

The disclosed techniques may enable the automated discovery of vulnerabilities and potentially malicious code in a software system, and the determination of possible risks that such vulnerabilities pose to overall mission success. The disclosed techniques may also improve software assurance by providing more thorough analysis against the types of threats and runtime environments seen in modern computing architectures, providing an increased visibility to threats specific to code running on certain types of components (e.g., GPU's) in heterogeneous platforms or in a distributed/cloud or virtual environment. By providing alerts in context, the present techniques enable an analyst to prioritize important changes and see the impact of potential vulnerabilities or malicious code. In addition, the integration and use and game tree models along with attack tree models may enable improved identification of potential adversarial actions that may be performed on a target computing system given its current operating state, as well as identification of possible responsive actions or responses that may be performed in this operating state, in order to address, prevent, mitigate, and/or reduce the likelihood of occurrence or the impact of any such adversarial actions.

Figure 2:
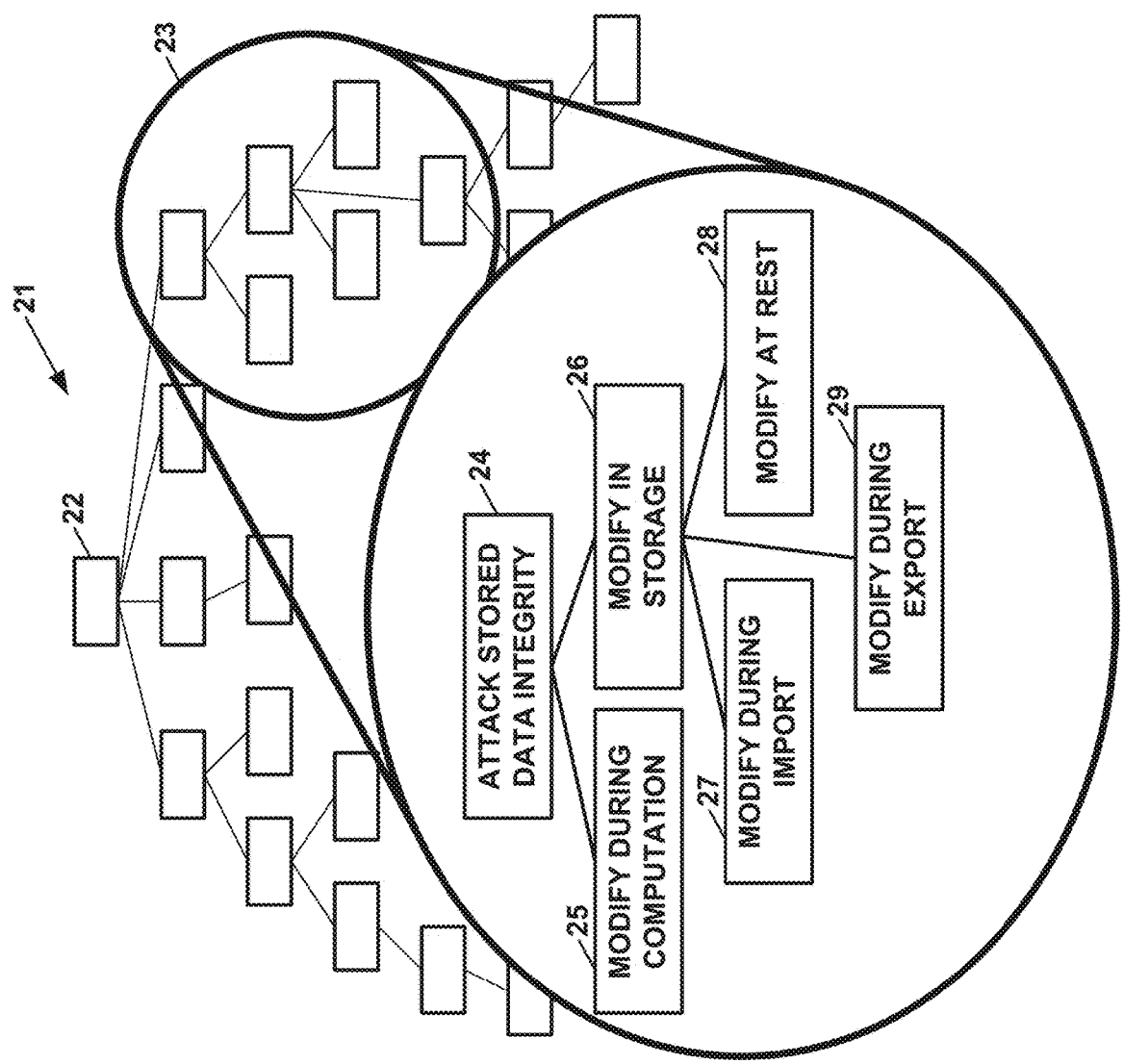
FIG. 2 is a conceptual diagram illustrating an example risk model, in accordance with one or more aspects of the present disclosure.

FIG. 2 is a block diagram illustrating an example risk model 21, in accordance with one or more aspects of this disclosure. In the example of FIG. 2, rectangular boxes correspond to tree nodes of risk model 21. A root tree node 22 has no parent tree nodes in risk model 21. In the example of FIG. 2, a portion 23 of risk model 21 is enlarged to show details of a subset of the tree nodes of risk model 21.

As shown in the particular non-limiting example of FIG. 2, a tree node 24 corresponds to the event of an attack on stored data integrity. Child tree nodes 25 and 26 of tree (parent) node 24 correspond to disjunctive preconditions of a first event (e.g., an attack on stored data integrity). Particularly, tree sub-node 25 corresponds to a second event (e.g., modifying data during computation) and tree sub-node 26 corresponds to a third event (e.g., modifying data in storage). Furthermore, in the example of FIG. 2, child tree sub-nodes 27, 28, and 29 of tree node 26 correspond to disjunctive preconditions of the third event (e.g., modifying data in storage). Particularly, tree node 27 corresponds to a fourth event (e.g., modifying data during import), tree node 28 corresponds to a fifth event (e.g., modifying data at rest), and tree node 29 corresponds to a sixth event (e.g., modifying data during export). In this way, FIG. 2 shows an excerpt of risk model 21 that describes an attack on data integrity. Applications 4 may store data associating each of tree nodes 24, 25, 26, 27, 28, and 28 with specific ways the events associated with tree nodes 24, 25, 26, 27, 28, and 28 may occur.

In various examples, an attack tree may be an example of risk model 21. Attack trees, such as the one illustrated in FIG. 2, may model how an adversary's aims can be achieved in terms of higher-level goals and corresponding sub-goals, along with system configuration choices. FIG. 2 shows an excerpt of a high-level attack tree that describes an attack on data integrity, where all children nodes 25, 26 and also 27, 28, 29 are disjunctive. That is, data could be modified either during computation (e.g., tree node 25) or in persistent storage (e.g., tree node 26). Stored data could be modified during import (e.g., tree node 27), during export (e.g., tree node 29), or when it not being actively used (e.g., tree node 28). Children nodes of an attack tree (e.g., risk model 21) detail specific ways an attacker could cause certain events to occur.

Figure 3:
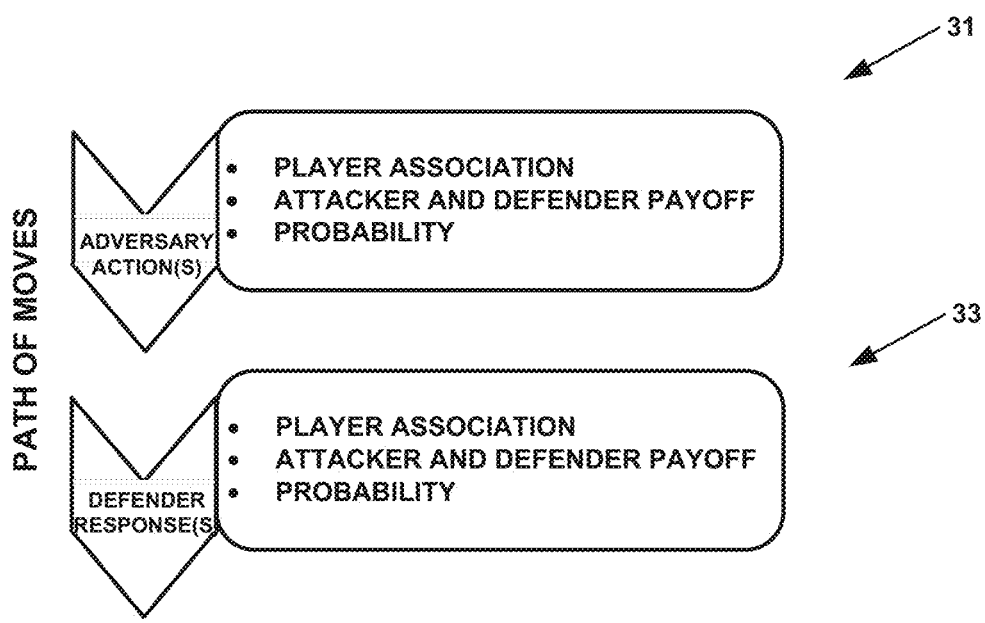
FIG. 3 is a conceptual diagram illustrating example information associated with adversarial actions and responsive actions, in accordance with one or more aspects of the present disclosure.

FIG. 3 is a conceptual diagram illustrating example information associated with actions and responses/responsive actions, in accordance with one or more aspects of the present disclosure. For example, FIG. 3 illustrates a conceptual model of one or more adversary actions associated with node 31 and one or more defender responses associated with node 33. Collectively, these adversary actions and defender responses represent a path of moves that may be taken by an adversary and corresponding responses that may be taken by a defender, such as within the scope or framework of an attack tree or risk model (e.g., risk model 21 shown in FIG. 2) and/or an action model (e.g., game tree). Nodes 31 and 33 may be included in a modeled tree, such as a game tree, as will be described in further detail below.

For example, in a given attack, within the framework of a particular attack tree or risk model, an adversary may perform one or more adversary actions. These actions may be associated with one or more nodes in a game tree, such as node 31 shown in FIG. 3. These nodes may have certain data components and may be associated with a particular adversary or player (e.g., human adversary, automated or virtual adversary), and may also be associated with a particular attacker payoff and/or defender remediation cost, depending on the severity or other rating associated with these adversary actions. In addition, these adversary actions may also be associated with a particular probability of occurrence in a target system under attack. The payoff, cost, and/or probability may, in many cases, be dependent on the current state of operation, or status, of the target system, and one or more of the payoff, cost, and/or probability may be used to prioritize, rank, and/or score adversary actions with respect to one another. In some cases, the data components or information may further include information about an attack goal/sub-goal, information about test procedures being performed on a target, and/or information about which target is being tested. All of such information may be included in or otherwise associated with node 31. In addition, node 31 may include information regarding a particular state or states of operation of a target that are associated with node 31.

In response to the one or more of adversary actions, a defender may implement one or more of defender responses, such as a defender response associated with node 33 shown in FIG. 3. These responses or responsive actions may have certain data components and may be associated with a particular defender or player (e.g., human defender, automated or virtual defender), and may also be associated with a particular attacker payoff and/or defender remediation cost, depending on the severity or other rating associated with these defender responses/responsive actions. In addition, these responses may also be associated with a particular probability of occurrence in the target system. The payoff, cost, and/or probability may, in many cases, be dependent on the current state of operation, or status, of the target system, and one or more of the payoff, cost, and/or probability may be used to prioritize, rank, and/or score adversary actions with respect to one another. In some cases, the data components or information may further include information about an attack goal/sub-goal, information about test procedures being performed on a target, and/or information about which target is being tested. All of such information may be included in or otherwise associated with node 33. In addition, node 33 may include information regarding a particular state or states of operation of a target that are associated with node 33.

Collectively, adversary actions 31 and defender responses 33 may comprise a path or set of moves that may be represented within one or more data models, such as an action model (e.g., game tree). According to various techniques of the present disclosure, these moves may be modeled or otherwise included within such an action model (e.g., game tree) that is associated with and references a particular risk model (e.g., attack tree). The action model may comprise a branching set of moves and/or move paths, as illustrated in FIG. 4.

Figure 4:
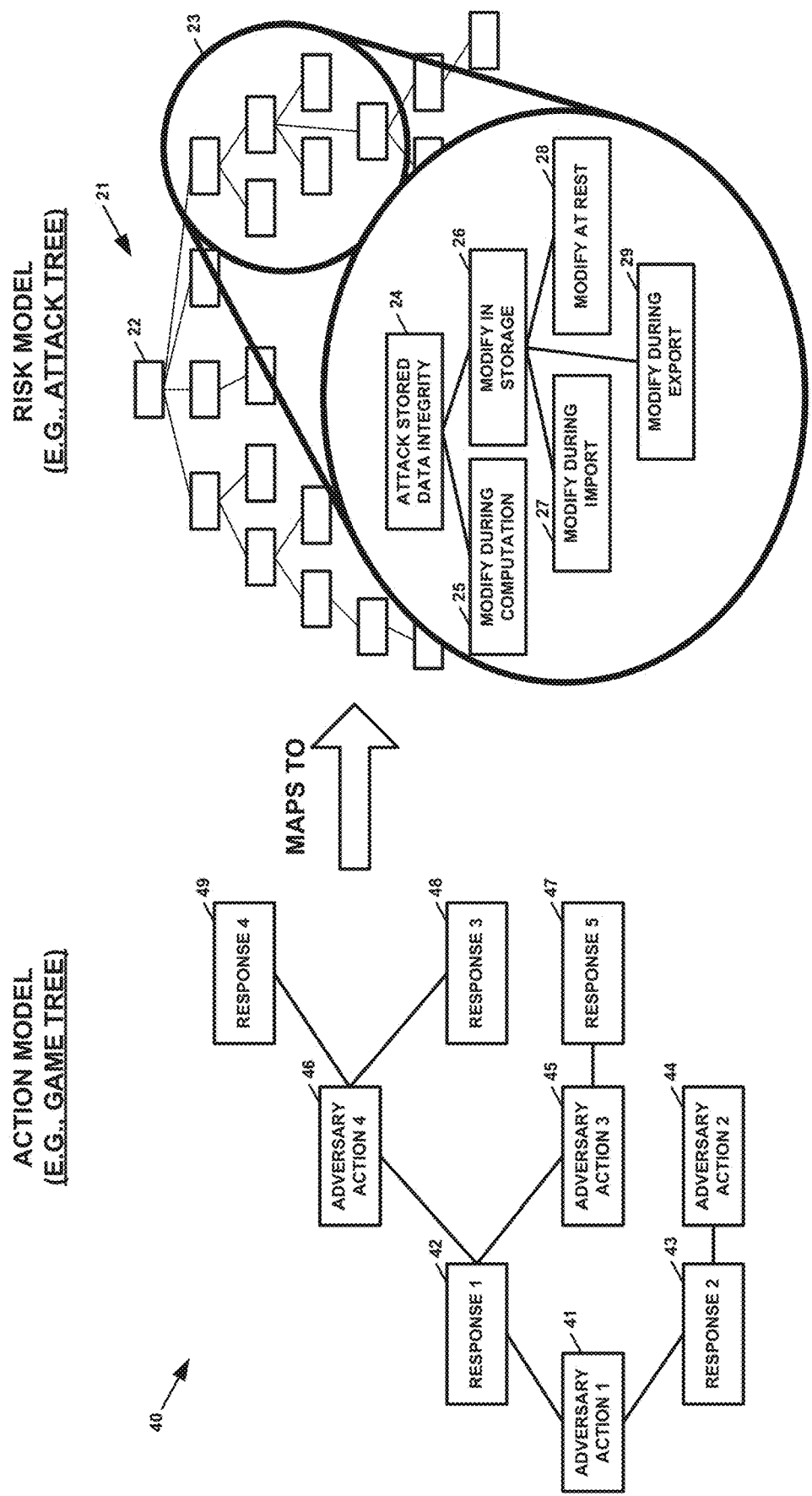
FIG. 4 is a conceptual diagram illustrating an example risk model in conjunction with an example action model, in accordance with one or more aspects of the present disclosure.

FIG. 4 is a conceptual diagram illustrating an example risk model 21 in conjunction with an example action model 40, in accordance with one or more aspects of the present disclosure. In this particular example, risk model 21 comprises an attack tree and will be referred to as attack tree 21. In addition, for this example, action model 40 comprises a game tree and will be referred to as game tree 40.

Game tree 40 and attack tree 21 may be used in conjunction during execution of applications 4 (FIG. 1B). Game tree 40 may reference or point to one or more portions (e.g., nodes) of attack tree 21. Game tree 40 may include various nodes, which may include one or more root nodes and one or more sub-nodes of any respective root node. Within the tree structure, any sub-node may also serve as a parent node to other further sub-nodes (e.g., children nodes) associated with the respective sub-node. Each tree node of the tree may correspond to one or more actions, such as adversarial actions or responsive actions. The structure of game tree may, in many cases, closely mirror the structure of attack tree 21, while providing the potential for insightful calculations with considerations for many possible system states. The structure of game tree 40 may model interactions between attackers and defenders. The data model of game tree 40 is a branching set of moves, each with data components that are used for game tree analysis, such as player affiliation, payoffs, and probabilities (e.g., such as shown in FIG. 3). The structure of game tree 40 may incorporate calculable metrics, such as those shown in FIG. 3 (e.g., attacker and/or defender payoff, attacker and/or defender cost, probability of action or response). One or more of the payoff, cost, and/or probability may be used to prioritize, rank, and/or score adversary actions or responsive actions with respect to one another, which may be visually represented when the adversary actions and/or responsive actions are output for display in a graphical user interface (e.g., within a dashboard). Game tree 40 can simulate interactions of player decisions by aggregating computable attributes and propagating them up the tree structure (e.g., from sub-levels to higher levels in the tree).

Based on use of game tree 40, analysts may be able to set scenarios, configure factors they want to see played out, and leverage computing power to simulate the interactions of player behavior. As shown in the example of FIG. 4, game tree 40 includes nodes 41-49, each of which may correspond to an adversary action or a defender response. Any individual node in game tree 40 may reference or be mapped to one or more nodes in attack tree 21. In addition, each node in game tree 40 that corresponds to an adversary action may have one or more sub-nodes that correspond to possible responses that may be taken or performed by a defender (e.g., defender of a target system, such as one or more or target computing systems 20 shown in FIG. 1B). Similar to the nodes in attack tree 21, the nodes of game tree 40 may also correspond to one or more states of operation of a target system. For example, if the target system is in a particular state or operating mode, that state or operating mode may be associated with one or more nodes, or portions, of attack tree 21, which may also be associated with one or more nodes, or portions, of game tree 40. Game trees offer a move-based analysis of the potential interactions between attackers, defenders, and the environment, as well as quantitative metrics on the utility of each parties' moves.

As shown in the example of FIG. 4, node 41 of game tree 40 is associated with a first adversary action ("ADVERSARY ACTION 1") that may be performed by an adversary (e.g., during a real-time scenario or during a simulation). As one non-limiting example, node 41 may reference, or map to, node 26 of attack tree 21, which corresponds to an attack event for modifying data in storage. In some cases, node 41 may reference multiple different nodes of attack tree 21. The data structure of node 41 may include, for example, a pointer to each node data structure in attack tree 21 to which node 41 references.

Game tree 40 may model different possible responses that may be taken by a defender upon occurrence of this first adversary action of node 41 (or, e.g., upon determining a state of a target system, where this particular state is associated with the first adversary action of node 41). As shown in FIG. 4, nodes 42 and 43 are sub-nodes of node 41. As a result, each of nodes 42 and 43 correspond to possible defender responses, and these nodes have a disjunctive relationship with respect to parent node 41. Node 42 corresponds to a first potential defender response ("RESPONSE 1") that may be taken in response to the first adversary action of node 41, and node 43 corresponds to a second potential defender response ("RESPONSE 2") that may be taken in response to the first adversary action of node 41. For example, these first and second potential defender responses may attempt to remedy, mitigate, or otherwise address the attack on stored data integrity associated with node 24 of attack tree 21.

Game tree 40 may further model different possible adversary actions that may be taken by an attacker or adversary in response to the defender's actions. Thus, as illustrated in FIG. 4, node 44 corresponds to an adversary action ("ADVERSARY ACTION 2") that may be taken in response to the defender response of node 43. As one non-limiting example, node 44 may map to node 27 of attack tree 21, which corresponds to an attack event for modifying data during import.

In addition, node 45 corresponds to one potential adversary action ("ADVERSARY ACTION 3") that may be taken in response to the defender response of node 42. For example, node 45 may map to node 28 of attack tree 21, which corresponds to an attack event for modifying data at rest. Node 46 corresponds to another, alternate potential adversary action ("ADVERSARY ACTION 4") that may be taken in response to the defender response of node 42. For example, node 46 may map to node 29 of attack tree 21, which corresponds to an attack event for modifying data during export.

Finally, game tree 40 may model different potential responses to these adversary actions. Node 47 corresponds to a defender response ("RESPONSE 5") that may be taken in response to the adversary action of node 45. Node 48 corresponds to one potential defender response ("RESPONSE 3") that may be taken in response to the adversary action of node 46, while node 49 corresponds to another potential defender response ("RESPONSE 4") that may be taken in response to the adversary action of node 46.

In such fashion, game tree 40 is capable of modeling various different adversary actions and possible defender responses to such actions, as well as follow-on adversary actions that may be performed in response to certain defender responses. The various different paths of actions and responses are included within game tree 40. These paths may be output in graphical form, as described in further detail below, to enable a user to visualize the possible adversarial or attack actions that may be performed on a given target system, or to which the target system may be susceptible to, based on the current status or operating state of the target system. These paths may also enable the user to visualized possible defender responses that may be taken or performed to combat or address each of these adversarial actions. Each of the nodes of game tree 40 may include further information or data components related to certain calculated metrics for the respective nodes (e.g., attacker payoff/cost, defender payoff/cost, probability of occurrence), such as illustrated in the example of FIG. 3, and these may, in some cases, be used to rank, prioritize, or score the adversary actions and/or responses with respect to one another.

Each of the nodes of game tree 40 and/or attack tree 21 may be associated with one or more operating states of a target system (e.g., one or more of target computing systems 20). As a result, upon applications 4 determining a particular operating state of the target system, applications 4 may identify which nodes of attack tree 21, and corresponding nodes of game tree 40, are associated with this particular operating state, and may then identify particular adversary actions in game tree 40 that may be performed against the target system in this operating state, as well as possible defender responses that may also be taken. In such fashion, the use of both attack tree 21 and game tree 40 enable a user, such as an administrator, with the ability to visualize the current state of a target system, potential vulnerabilities with associated metrics, potential adverse actions with associated metrics, and potential targeted responses with associated metrics. Thus, the present techniques combine the use of attack trees, a noted cybersecurity modeling technique, with game trees, providing a particular approach to quantitative evaluation of risk metrics that includes the use of game theory analysis and simulation. These techniques provide tools for generating, modifying, and maintaining attack tree structures, which serve as the basis for game tree models.

One or more of the disclosed techniques may address scalability and maintenance concerns in traditional cybersecurity with enhanced attack tree modeling. In many cases, it is common to see many repeated branches in different contexts within real-world attack tree structures. In the past, making large, enterprise-quality attack trees without additional tools was time-consuming and unmanageable, and binary results from attack goals often revealed little about how to address the underlying configuration issues. The present techniques include various features to address these and other limitations.

A template goal may be a feature that enables repeatable branches of an attack tree, such as attack tree 21 shown in FIG. 4, to be represented abstractly for reuse in branches that share the same pattern. The template goal is used to replace copy-pasted segments with segments that are linked by a common parent or template. Template goals enable the user to modify a single source branch to impact every concrete use of that template in the tree. Overlay goals contain the concrete implementations of template goals. This makes a significant contribution towards making large attack trees, such as attack tree 21, more manageable.

Figure 10:
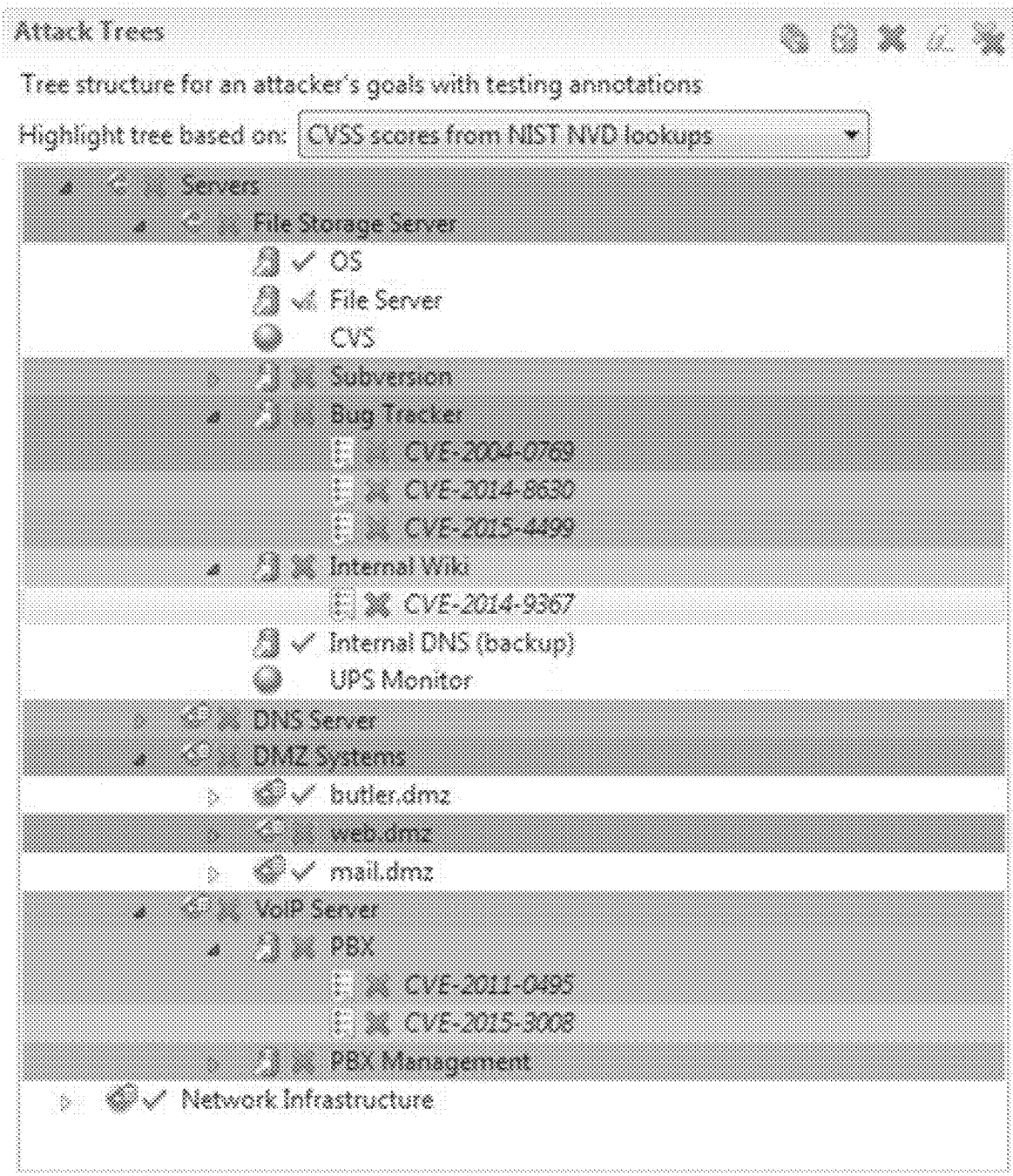

The disclosed techniques provide a tree structure, based on the attack and/or game tree model, for encapsulating the results of automated tests. A test record may act as a main point of scrutiny for a target system. Instead of just offering a binary result metric indicating the passing or failure of an automated test, test records disclosed are also capable of conveying information about non-performance of tests that have failed to run. Overriding the result manually can override failures as well as provide a way to express the results of non-automatable evaluation, such as employee training. Beyond the automated test results, tools are provided for weighing risk metrics on tree goal results (e.g., by risk analysis module 10 shown in FIG. 1B). Tree models may contain computed values, such as remediation cost, to indicate priority. Tagging and highlighting test results can be done to make limitations more apparent (e.g., by graphical user interface module 8), such as shown in the example of FIG. 10. Computed values and metrics may be calculated on every new test run, propagating results to parent nodes in the attack tree.

Figure 8:
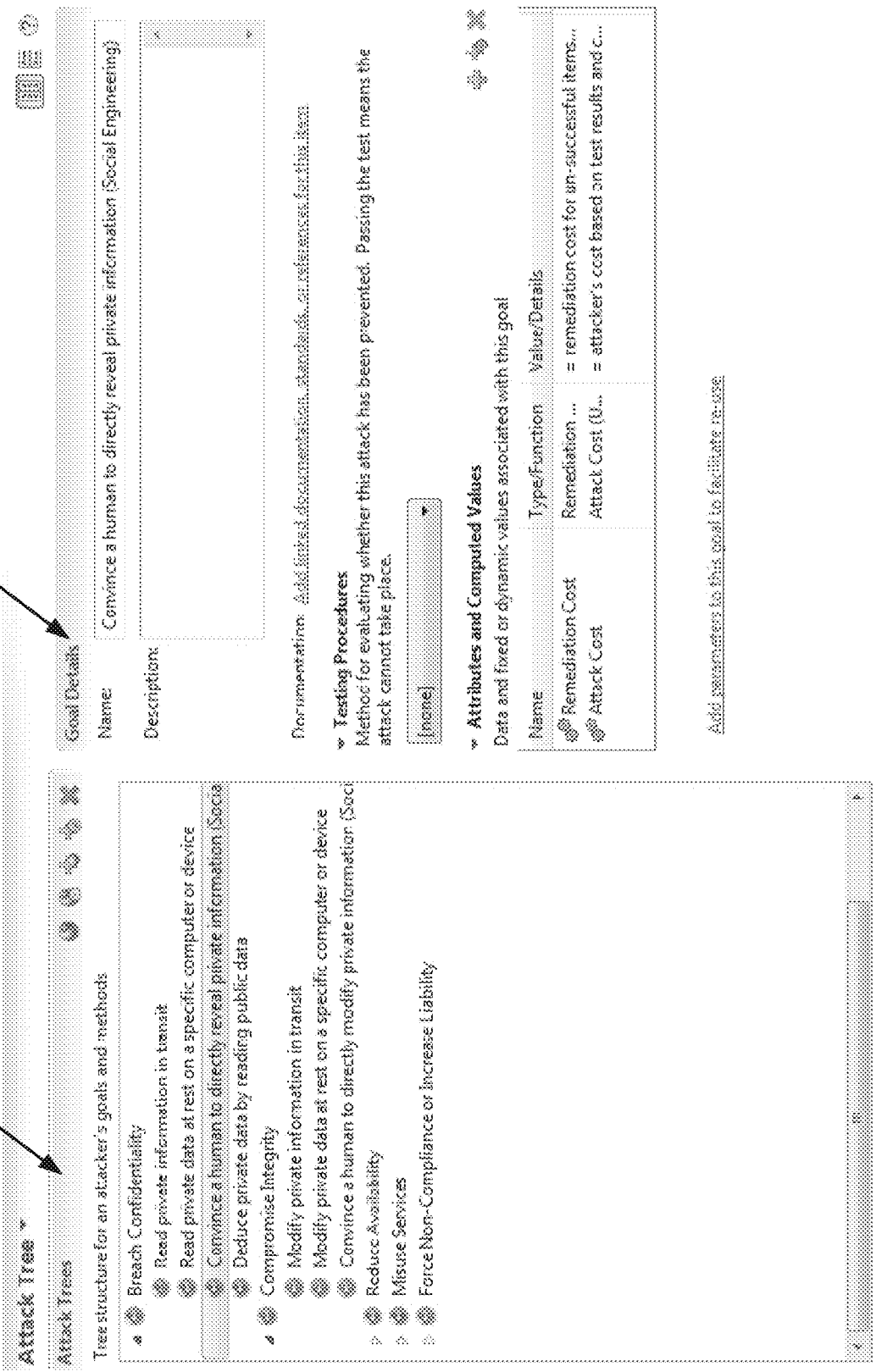

As noted above, the structure of game tree 40 may be similar to, or closely mirror, the attack tree structure of attack tree 21. The use of game tree 40, however, provides the potential for complex calculations with considerations for many possible system states of one or more target systems, such as one or more of target computing systems 20 illustrated in FIG. 1B. As part of the game tree structure, the present techniques implement mechanisms by which calculated values may be passed up to parent nodes and ways to reuse node/trees (e.g., such as through the use of the templates described previously). FIG. 8 illustrates an example of "attributes and computed values" in area 122, which are the types of values that may be passed up to parent nodes within attack tree 21 and/or game tree 40.

In some cases, analysts are able to utilize applications 4 of network security and threat assessment system 2, including graphical user interface module 8, to set scenarios and configure factors they want to see played out, and allow simulations to work through the other factors through "what-if" scenarios during execution of agents/test modules 12 and analysis of results using risk analysis module 10. In non-limiting examples, single turn simulations may be run by applications 4, which are simulations that calculate the end values of one or more target systems (e.g., one or more of target computing systems 20) after all moves have been taken based on payoffs and probabilities of moves.

One or more of the techniques and features described herein may provide numerous advantages over existing vulnerability scanning or security-oriented software architectures. Granular risk analysis metrics such as remediation costs and attack impact provide value for non-subject matter experts to understand and maintain highly technical computational environments, such as those provided by target computing systems 20. These capabilities are augmented further with visualization tools and a fitting user interface provided by graphical user interface module 7, various examples of which are shown in FIGS. 8-12. One or more of the techniques may capture features of an internal security model, previously only provided by a cybersecurity subject matter expert, through powerful computational capabilities on security relevant metrics. These capabilities are managed through a concise and powerful software architecture that requires little additional management overhead to use.

Network security and threat assessment system 2 illustrated in FIG. 1B may provide a software system (e.g., via applications 4) for handling the creation of attack tree models in conjunction with game tree models, as well as managing records of test procedures. As described above, attack trees (e.g., attack tree 21) are used to store a hierarchical outline of how a target system may be vulnerable. Risk analysis module 10 and/or rule-based/machine learning engine 6 may translate the attack tree model into a game tree and test record, which analyze and store results of test procedures, respectively. The test record also maintains a list of target descriptors which are typically addressable hosts or nodes in the target system (e.g., one or more of target computing systems 20A).

An attack tree provides a data model for storing, maintaining, and visualizing vulnerabilities and limitations of a target system. In some examples, the attack tree (e.g., attack tree 21) is stored in an Extensible Markup Language (XML) based file format that can be exported, shared, imported, and manipulated easily. As noted above, nodes in the attack tree (e.g., nodes 24, 25, 26, 27, 28, 29), or attack tree goals, contain information about what the attack or attack goal/sub-goal might be, how it can be tested (e.g., through assignment of identifiers of tests or test agents that may be identified and executed by agents/test modules 12), and which target it should be tested on (e.g., identifiers of one or more of target computing systems 20). Attack tree goals can be augmented with other attributes or calculated metrics, such as attack cost or remediation cost. In the attack tree, users may configure target descriptor details, such as the hostname and authentication credentials, for individual nodes within the tree, to identify the target associated with these nodes. The test procedures outlined in the corresponding nodes of the attack tree are then enacted on the respective target descriptor or target descriptor group.

A game tree, such as game tree 40, identifies and quantifies the risks to a target system. The game tree may, in many cases, be generated based on the contents and structure of the attack tree (e.g., information about what the attack or attack goal/sub-goal might be, how it can be tested, which target it should be tested on, attack cost, remediation cost). Within the hierarchical structure to the attack tree, the game tree maintains a set of games as branching, interconnected sets of moves. Attacker moves are made in reference to the current state of the target, with payoffs for defenders and attackers on each tree node of the game tree, such as illustrated in FIG. 3 (which may, in some cases, be used to prioritize, rank, or score adversarial actions and/or responsive actions). The state of the target system may, in many cases, be determined by automated test procedure queries, or as finite sets of possible device states. The game tree may also have an WL-based file format, separate but similar to the attack tree format. The results are received, recorded, and propagated through the attack tree and game tree to give a high-level simulation of attacker and defender interactions (e.g., during one or more simulations performed by simulation module 9). Several visualization tools are provided in an integrated dashboard to help users understand the results (e.g. via graphical user interface 8).

The game tree model of game tree 40 may defines the interaction between the attacker, the defender, and the underlying environment that they operate within (e.g., environment of the target system). The cybersecurity-oriented data model of attack tree 21 defines the potential actions of an attacker in a hierarchical tree structure. Similarities between game tree and attack tree structures lead to a compelling potential for simulating game interactions based on attack tree hierarchies, and for quantitatively measuring risk in scenarios that may potentially have high levels of uncertainty. Through the implementation of attack tree 21 and game tree 40, system analysts may use network security and threat assessment system 2 to initiate simulated attacks using simulation module 9 against a target system and monitor system performance and associated test results. For example, device failures by power outage could be simulated to identify high-level implications to the health and status of the overarching network, and various potential risks, vulnerabilities, adversary actions, and associated remediations/responses may be identified by attack tree 21 and/or game tree 40 during the course of the simulation, based on the test results obtained during the simulated attack and the determined operating state of the target. Modeling anomalous circumstances originating from nature or other non-deterministic sources is one way to account for the complexity and uncertainty in defensive cybersecurity operations.

As part of this task, simulation module 9 may store and manage multiple game simulation scenarios. Each game scenario may be determined by the state of the network and the supported computing environment. Points of interest, such as the network status of a device in the target system, can be tested using test procedures initiated by agents/test modules 12. In addition to automated test procedures that, e.g., query online devices, the set of possible system states can be overridden to simulate special attack environments, according to certain non-limiting examples. Simulating attack environments in this way may offer a more complete view of the target attack surface.

Test procedures are automatable actions that agents/test modules 12 may perform to verify the possibility of the specified attack or identify the status of target devices. Agents/test modules 12 provide a wide selection of remote test procedures, ranging, e.g., from secure shell (SSH)-based commands to specific cloud-specific application programming interface (API) queries, to name only a few examples.

As a non-limiting example, one scenario might involve a security analyst using network security and threat assessment system 2 who wishes to prevent the analyst's user account from being compromised. To model this scenario, the analyst may utilize applications 4 (e.g., graphical user interface module 8, risk analysis module 10) to create a new attack tree and add a new tree goal. The high-level goal of the attack may be to steal credentials to the administrative account. Nested within that goal, the security analyst may utilize applications 4 to specify various different ways that an attacker may steal secure credentials, and may model these as sub-goals. One way for an attacker to accomplish this goal may be to take advantage of misconfigured permissions on the administrative SSH key. Anticipating this attack, the security analyst may utilize applications 4 (e.g., using agents/test modules 12) to add a test procedure to the attack tree goal that checks if the permissions set on the target SSH key file match the desired configuration. When the analyst is ready to test a target (e.g., one of target computing systems 20), the analyst may use applications 4 (e.g., graphical user interface module 8, risk analysis module 10, agents/test modules 12) to generate a game tree based on the tree model of the attack tree, and to configure the target descriptor of the target. When directed, applications 4 may combine the test procedure and target descriptor to execute the file permission check on the SSH key. The result of that check is stored in the game tree, and the aggregate result of any other credential stealing test procedures initiated by agents/test modules 12 may be propagated up the game tree and/or attack tree from child nodes to parent nodes, where they may be clearly displayed to the analyst (e.g., via graphical user interface module 8).

In such fashion, one or more of the disclosed techniques may greatly simplify the processes of managing and maintaining complex systems from security concerns. As a result, users are provided with the freedom to push the limits of computing complexity without the additional efforts necessary to maintain and protect a complex attack surface directly. Once a tree model is created and the game tree has been generated, the user is able to run test procedures on the target system. The details of this configuration and testing are stored in test records within the game tree and/or attack tree. Applications 4 (e.g., via risk analysis module 10, graphical user interface module 8, and/or rule-based/machine learning engine 6) displays the system state through identified vulnerabilities or potential misconfigurations, and may propagate granular details to higher, human-readable abstractions. FIG. 10 shows one example of a test record visualization highlighting operating system and software vulnerabilities.

Predictive move module 11 may also implement predictive move or response suggestions. Through the implementation of such suggestions, network security and threat assessment system 2 may enable users to better manage and mitigate risk through these automated predictive move or response suggestions. Move suggestions may be integrated into the attack tree model (e.g., attack tree 21) and/or the game tree model (e.g., game tree 40) to allow predictive move module 11 to suggest proper responses to attack scenarios. These predictive moves/responses will suggest mitigation techniques for parent attacks.

Graphical user interface module 8 may output a graphical representation of these predictive moves or responses within a graphical user interface. For example, if a current test performed on a target system is associated with node 26 of attack tree 21, the test results may indicate a particular vulnerability of target system based on a current operating state of this target. Node 26 of attack tree 21 may be associated with node 41 of game tree 40, indicating that, based on the current identified vulnerability, the target system may be vulnerable or susceptible to the adversary action represented by node 41 (e.g., "ADVERSARY ACTION 1"). Predictive move module 11 may interact with graphical user interface module 8 may output a graphical representation of this potential adversary action and, in some cases, an indication of one or more of calculated metrics associated with the test results and identified state of the target (e.g., an estimated attacker/defender payoff, an estimated defender cost of remediation, an estimated probability of occurrence of the adversary action).

Because sub-nodes 42 and 43 are associated with parent node 41, wherein sub-nodes 42 and 43 represent potential response to the adversary action of node 41, graphical user interface module 8 is capable of outputting a graphical representation of predictive, suggested moves or responses represented by nodes 42 and/or 43, in anticipation of, or in response to, the potential adversary action of node 41. Based on certain metrics associated with nodes 42 and/or 43 (e.g., an estimated defender payoff, an estimated defender cost of remediation), predictive move module 11 may be capable of prioritizing, ranking, or scoring the responsive actions represented by nodes 42 and/or 43, and suggesting the responsive actions having the higher priority, ranking, or score. For example, predictive move module 11 may suggest the response represented by node 42 ("RESPONSE 1") if this response has a higher calculated payoff and/or a lower cost of remediation relative to the response that is represented by node 43 ("RESPONSE 2").

In such fashion, predictive move module 11 and/or graphical user interface module 8 may provide the user not only with information associated with current possible vulnerabilities of a target system, including possible adversarial actions that may be performed against the target system, it may also provide the user with suggested responsive actions based on the current operating state of the target. These suggested responsive actions may be intended to address certain adversarial actions or even to prevent such actions from occurring.

In order to provide accurate and meaningful predictive move suggestions, risk analysis module 10 and/or rule-based/machine learning engine 6 may account for additional information about each attack scenario. Attack tree goals in attack tree 21 may be tagged with information about more general principles of the attack. For example, an attack against the reliable service of a login endpoint might be tagged with "denial of service." Similar tags could be used to categorize man-in-the-middle attacks, social engineering attacks, and other generalized notions of attacks, to name a few non-limiting examples.

With tags to indicate the class and general characteristics of an attack, common pairings of attack classes and remediation may also be identified. These pairings may be based on common defensive strategies and remediation techniques, in addition to common pairings within the same attack tree and/or game tree. Suggestions may be shown when creating new children of game tree nodes. In some cases, subject matter experts may pre-load information about common remediation techniques into one or more of the trees. Expert input, combined with the ability to easily store and share information, lowers the bar for other system analysts and maintainers. A database of known attack classes and their relation to each other may be included or stored in one or more of local knowledge base 16 and/or central knowledge base 18. This database may be used by risk analysis module 10 and/or rule-based/machine learning engine 6 to identify common attack and remediation pairings that may be utilized in modeling attack tree 21 and/or game tree 40. This implementation may lower the bar for system analysts and non-subject matter experts who protect sensitive systems and information. Inexperienced users are able to view predictive suggestions output by graphical user interface module 8 to inform them of possible responses to actions that may be taken against a target system. For subject matter experts, these suggestions may also help identify potentially overlooked aspects of the attack surface. Ultimately, predictive move suggestions may result in lower management overhead of target computing systems 20, as well as more attack tree models.

One or more of the techniques disclosed herein may enable periodic and automated re-evaluation of nodes, and tree models helps pinpoint internal and external changes and analyze their potential impacts. These techniques may facilitate remediation procedures in defender moves or strategies, and may, in some examples, use known classes of attacks to suggest common defensive techniques for attack remediation or possible follow-up attacks to a user of applications 4 and analyst computing system 2. These techniques may also enable the measurement of quantitative risk to a target environment by incorporating cybersecurity relevant game theory formalisms to the game tree structure.

FIG. 5 is a block diagram illustrating one example of various components shown in FIG. 1B, in accordance with one or more aspects of the present disclosure. FIG. 5, for example, illustrates further example details of agents/test modules 12 and target computing system 20A shown in FIG. 1B.

As illustrated in FIG. 5, target computing system 20A may include one or more operating systems 60, one or more applications 66, one or more application libraries 65, and one or more hardware and/or virtual components 70 (e.g., one or more GPU's, one or more FPGA's, one or more virtual components). Operating systems 60 includes one or more remote agent/command execution units 62 and one or more system libraries 64. Although shown as separate blocks in FIG. 5, applications 66 may, in some cases, be included in operating systems 60.

Agents/test modules 12, as illustrated in FIG. 5, may include one or more static analysis tools 30, one or more system state monitors 32, one or more active monitors (e.g., function and/or API hooks), one or more platform configuration test modules 36, and one or more external probes 38. Agents/test modules 12 are part of network security and threat assessment system 2. As described earlier, network security and threat assessment system 2 may monitor execution of applications 66 on target computing system 20A. In various cases, agents/test modules 12 are capable of retrieving or otherwise obtaining information associated with an operating state of target computing system 20A, such as prior to, during, or after execution of applications 66.

Static analysis tools 30 are capable of performing static analyses of any source code, including script or other forms of source code, which is compiled or otherwise processed/interpreted for execution of operating systems 60 (including remote agent/command execution units 62 and system libraries 64), and/or execution of applications 66 of target computing system 20A. In some cases, source code may be unavailable, in which case static analysis tools 30 may not be used or implemented. However, in other cases, such as illustrated in the example of FIG. 5, application and/or library source code 50 may be available for analysis by static analysis tools 30. In certain examples, as noted further below, application/library source code 50 may include Open Computing Language (OpenCL) code. In the example of FIG. 5, static analysis tools 30 may analyze application/library source code 50 that is compiled or otherwise processed for execution of system libraries 64, application libraries 65, and/or applications 66. Static analysis tools 30 may analyze code 50 based on one or more rules to identify, for instance, potentially malicious, unusual, or unexpected function calls or sequences of instructions that may cause risks or other vulnerabilities to a target computing system during use of system libraries 64, application libraries 65, and/or execution of applications 66. Static analysis tools 30 may provide analysis results to risk analysis module 10 (FIG. 1B) for further processing, as described further below.

System state monitors 32 may perform monitoring of operating systems 60 and/or applications 66. In some cases, system state monitors may perform one or more system state tests to obtain test result or monitoring information from operating systems 60 and/or applications 66 to identify information and/or parameters associated with an operating state of target computing system 20A. As one example, system state monitors 32 may monitor any changes to file systems used by operating systems 60 and/or applications 66, and may also, in some cases, determine which programs or processes are executing at a given time. In some instances, system state monitors 32 may invoke or otherwise utilize remote agent/command execution units 62 in target computing system 20A. Remote agent/command execution units 62 are operable to perform certain actions on target computing system 20A and provide corresponding results or other information (e.g., changes to file systems, information about which programs are executing) back to system state monitors 32 of network security and threat assessment system 2. System state monitors 32 may provide monitoring information to risk analysis module 10 (FIG. 1B) for further processing.

Figure 6:
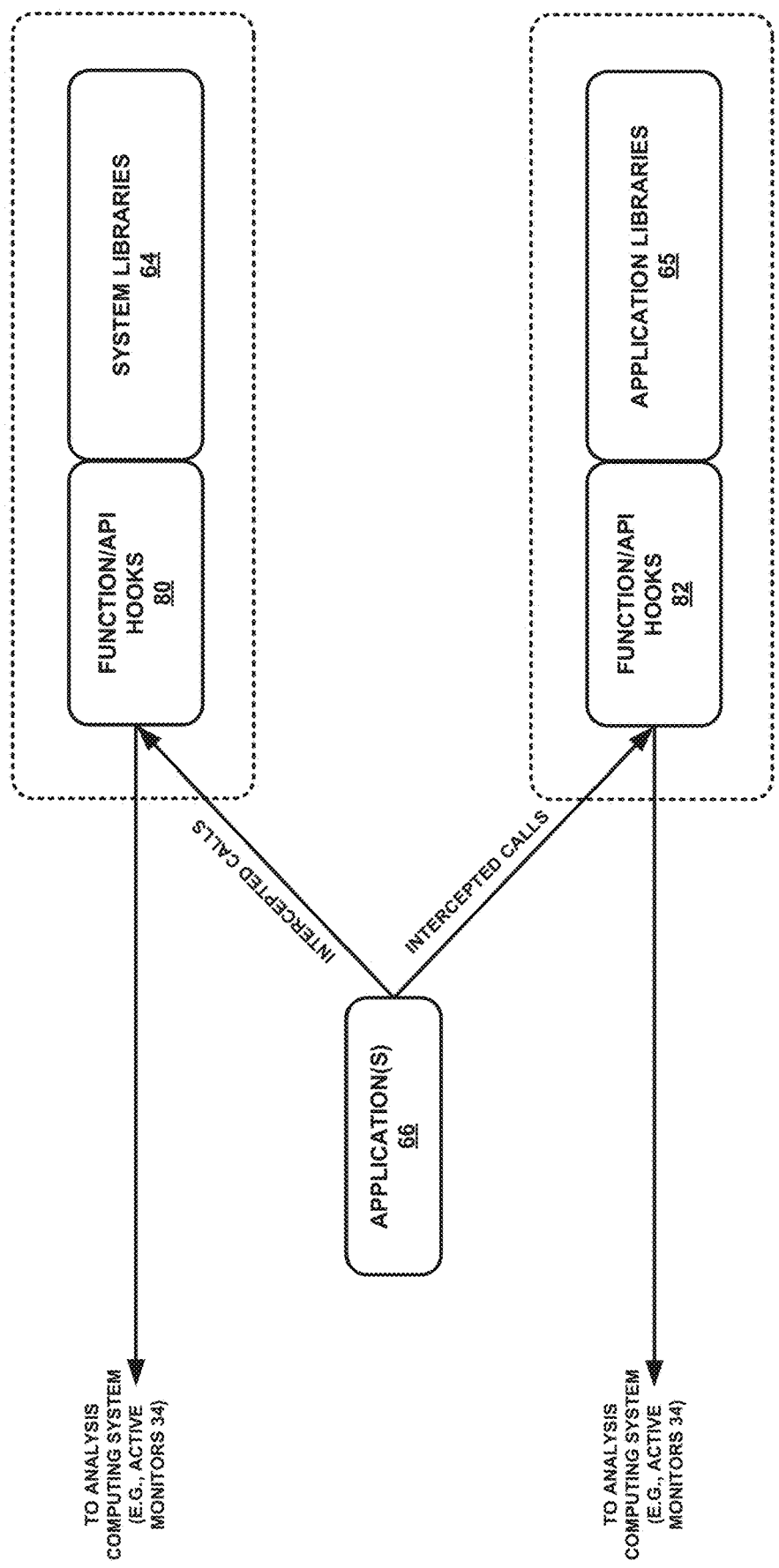
FIG. 6 is a conceptual diagram illustrating example function and/or application programming interface (API) hooks, in accordance with one or more aspects of the present disclosure.

Active monitors 34 may perform active monitoring of target computing system 20A during execution of applications 66. In some examples, active monitors 34 may make use of function and/or API hooks that are implemented in target computing system 20A. In these examples, as further illustrated in FIG. 6, target computing system 20A may provide wrappers or instrumented code for function and/or API calls that are invoked by applications 66 during execution. FIG. 6 is a conceptual diagram illustrating example function and/or application programming interface (API) hooks, in accordance with one or more aspects of the present disclosure. In the example of FIG. 6, function and/or API hooks 80 may provide wrappers or instrumented code for corresponding function and/or API calls to system libraries 54 that are invoked by applications 66 during execution. Similarly, function and/or API hooks 82 may provide wrappers or instrumented code for corresponding function and/or API calls to application libraries 65 that are invoked by applications 66 during execution. In some examples, function/API hooks 80, 82 may serve as respective wrappers to system libraries 54 and application libraries 65. In some examples, function/API hooks 80, 82 may be respectively included within system libraries 54 and application libraries 65.

When applications 66 invoke function and/or API calls that are intercepted by function/API hooks 80 and/or 82, the wrappers or instrumented code intercept such calls and are capable of performing other analysis or monitoring functions, such as reporting the entire call stack and/or arguments for selected functions within a binary, system libraries 64, application libraries 65, or operating system 60. For example, file wrappers or instrumented code provided by function/API hooks 80, 82 that is implemented on target computing system 20A for select function and/or API calls invoked by applications 66 may log information to a log file, such as one or more of the functions or API's being invoked and the arguments (possible including the contents of any file handles or other nested structures), a return status (e.g., whether the call succeeded), values of any passed-by-reference structures after the call completes, any access tokens, the program counter of the caller (e.g., one of applications 66), and/or the program counter of the last call from an application instance (e.g., one of applications 66). The wrappers or instrumented code provided by function/API hooks 80, 82 may store such information for each invocation of a particular function call (e.g., call to operating systems 60, application libraries 65, and/or system libraries 64) or an API by applications 66. Through the use of such wrappers or instrumented code, potentially important or critical operating system function calls or other API calls invoked by applications 66 may be used by active monitors 34 to detect usage patterns and examine the function call stack of each function or API call.

In some cases, the wrappers or instrumented code may provide monitoring information back to network security and threat assessment system 2 (e.g., to active monitors 34), such as function call data or API call data corresponding to the function or API calls intercepts by function/API hooks 80, 82. In some cases, remote agent/command execution units 62 may provide such monitoring information to active monitors 34 (e.g., from log files stored on target computing system 20A). In such fashion, active monitors 34 may, along with the use of monitoring information provided to risk analysis module 10, attempt to address and identify the threats or vulnerabilities posed by, e.g., GPU-assisted malware and other heterogeneous hardware runtimes provided by target computing system 20A.

In order for malicious software in one or more of applications 66 to use of one or more of hardware/virtual components 70, such as a GPU or a virtual component (e.g., virtual GPU), the software may, in certain instances, make requests through operating system or application API's (e.g., API's of system libraries 64, API's of application libraries 65) that give appropriate access to the hardware and/or virtual components. The OpenCL API, for instance, defines ways in which software may access a GPU as an abstracted acceleration device. OpenCL uses the Low Level Virtual Machine (LLVM) compiler toolchain's Intermediate Representation (IR) and generates hardware-specific (e.g., GPU-specific) code at runtime, depending on which one or more of hardware/virtual components 70 execute the hardware-specific code. (In certain examples, static analysis tools 30 may be operable to perform analysis of such IR.) In cases where hardware and/or virtual components 70 include a GPU, GPU-assisted malicious code executed by applications 66 may often use both function calls to operating systems 60 (e.g., API's to system libraries 64) and/or application API's (e.g., API's to application libraries 65, such as OpenCL API's) in order to have an external effect. As one non-limiting example, a memory management API of the operating system (e.g., in system libraries 64) is often used to map memory into sections that are visible to a graphics card. It is this type of example process that GPU-assisted malicious code executing in applications 66, such as keyloggers or decryptors, use to make data visible to the GPU.

Thus, active monitors 34 may, in various examples, receive monitoring information from target computing system 20A based on the application of function/API hooks 80 into system libraries 64 (e.g., hooks for operating system function calls) and/or function/API hooks 82 into application libraries 65 (e.g., hooks for OpenCL API calls). Through the processing of such information, network security and threat assessment system 2 may utilize risk analysis module 10 to identify potentially risk or malicious code executing in applications 66 of target computing system 20A (e.g., GPU-assisted malicious code), or other potential vulnerabilities in the execution of applications 66. In certain non-limiting examples, target computing system 20A may provide hooking via function/API hooks 80 of low-level kernel calls into system libraries 64 (e.g., via Windows's ntdll.dll gateway library) for loading new kernel modules and other highly security-sensitive operations. In these non-limiting examples, hooks into a library such as this may catch code using high-level API's such as CreateService( ) as well as their underlying implementations: ZwLoadDriver( ) and ZwUnloadDriver( ).

As shown in FIG. 5, agents/test modules 12 may also include platform configuration test modules 36. As noted earlier, platform configuration test modules 36 included in agents/test modules 12 may identify configuration information associated with target computing system 20 A. This configuration information may include security settings, user account information, permission information, or other type of configuration information associated with applications 66 or target computing system 20A in general.

External probes 38 comprise one or more probes that interact with one or more external interfaces of target computing system 20A. For example, if target computing system 20A is a web server, external probe 38 may include a command-line tool (e.g., "wget") that performs web-requests on target computing system 20A. Other non-limiting examples of external probes 38 may include a network probe tool, an nmap tool, or a tool to connect to target computing system 20A (e.g., secure shell server) to determine the version of computing system 20A.

Figure 7:
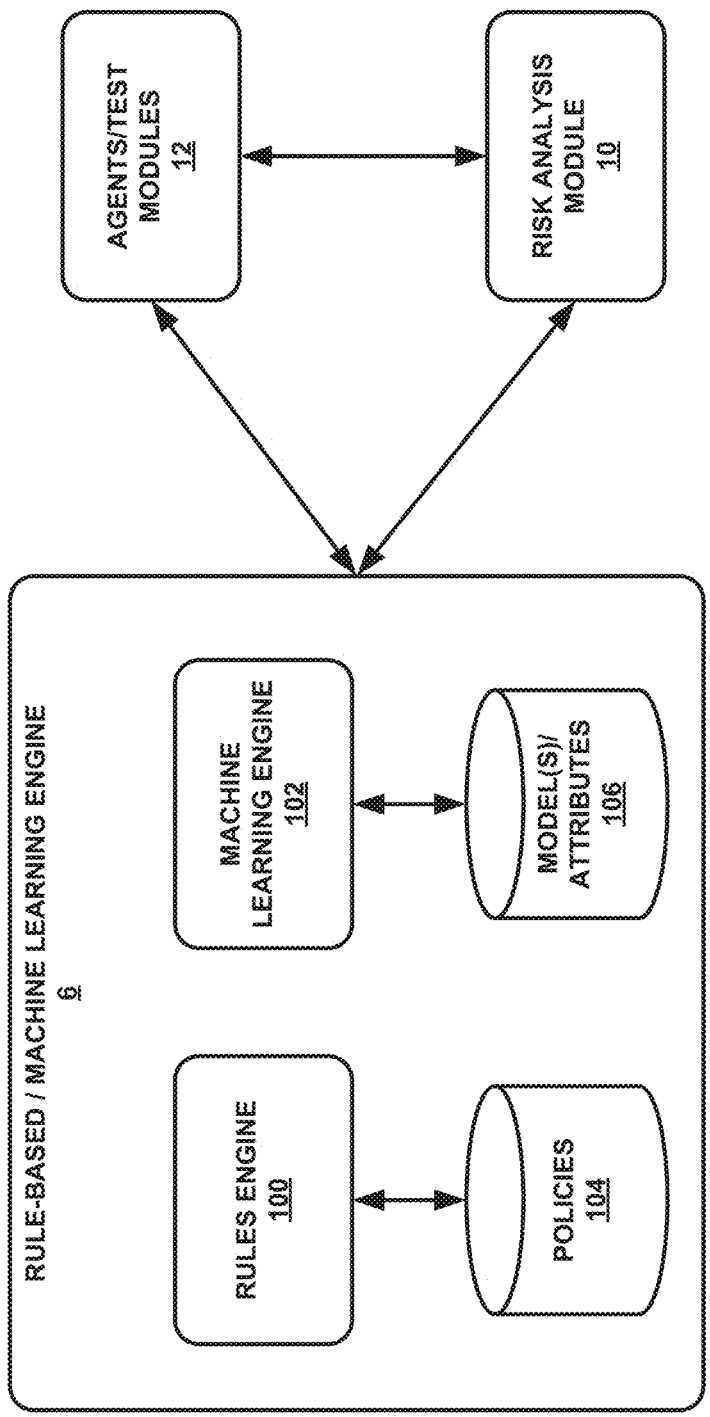
FIG. 7 is a block diagram illustrating further details of one example of the rule-based/machine learning engine shown in FIG. 1B, in accordance with one or more aspects of the present disclosure.

FIG. 7 is a block diagram illustrating further details of rule-based/machine learning engine 6 shown in FIG. 1B. As shown in FIG. 7, rule-based/machine learning engine 6 interacts with agents/test modules 12 and risk analysis module 10. As previously described in reference to FIG. 1B, in some examples, rule-based/machine learning engine 6 may be part of or otherwise included in risk analysis module 10.

Upon use of agents/test modules 12 during execution of applications 66 on target computing system 20A, agents/test modules 12 may provide monitoring information or test results to risk analysis module 10 and/or rule-based/machine learning engine 6 for further processing and analysis. Risk analysis module 10 may attempt to detect potentially suspicious activity by processing the information provided by agents/test modules 12, utilizing rule-based/machine learning engine 6.

As shown in the example of FIG. 7, rule-based/machine learning engine 6 includes rules engine 100 and machine learning engine 102. Rules engine 100 utilizes one or more policies 104, and machine learning engine 102 utilizes one or more models 106. Risk analysis module 10 and rule-based/machine learning engine 6 may apply a hybrid approach of rules combined with machine-learning to discover vulnerabilities associated with execution of applications 66 on target computing system 20A, such as unanticipated or potentially malicious program flows.

Rules engine 100 may use policies 104 to analyze information provided by agents/test modules 12. Through such analysis, rules engine 100 may identify possible vulnerabilities, or triggers, associated with very likely malicious activity that has little likely value in legitimate code in applications 66. For example, based on execution of applications 66 and monitoring information provided by agents/test modules 12 (e.g., information provided via function hooks or instrumented code on target computing system 20A), rules engine 100 may determine that loading a kernel driver as well as starting GPU-accelerated code within the same process, during execution of applications 66, is suspect because those two functions are typically not used in the same computational process. Similarly, rules engine 100 may determine that certain sets of arguments to OpenCL and/or operating system calls, as provided via function hooks or instrumented code, can be flagged as creating specific vulnerabilities, even if not intentionally malicious. In various examples, rules engine 100 may flag such instances as warnings.

Policies 104 used by rules engine 100 may provide various rules and corresponding weights and/or thresholds. Rules engine 100 may process monitoring information provided by agents/test modules 12, using policies 104, where corresponding weights or thresholds of rules may be associated with likelihoods of possible vulnerabilities, or triggers (e.g., triggers of malicious activity), based execution of applications 66.

In addition to rules engine 100, rule-based/machine learning engine 6 may also use machine learning engine 102. If rules engine 100 does not trigger or identify any alerts or warnings associated with vulnerabilities, machine learning engine 102 may also analyze the monitoring information from agents/test modules 12. Machine learning engine 102 may use one or more models/attributes 106. As non-limiting examples, models/attributes 106 may include Classification and Regression Tree (CART) and/or Support Vector Machine (SVM) models. Through the use of models/attributes 106, machine learning engine 102 may discern the likelihood of occurrence for malicious code based on a set of known good/bad training examples. In some cases, in order to avoid an extremely large number of attributes as inputs for models/attributes 106, machine learning engine 102 may pre-filter by selecting certain attributes (e.g., certain API call arguments or parents on a call stack) that are discriminatory between malicious and legitimate code. In some examples, CART models may be used when the source data's attributes fall into "bins", such as a C enum or a set of flags as a function call parameter. In some examples, SVM models may be used when attributes are continuous values, such as an integer value for a buffer size.

Once rules engine 100 and/or machine learning engine 102 has initially processed the monitoring information provided by agents/test modules 12, the results may be combined with relative weights in an effort to minimize false alarms. For instance, a given rule in policies 104 can have a weight corresponding to its likelihood of flagging malicious behavior. This weight can be compared to a corresponding "confidence value" produced by one or more of models in models/attributes 106 (e.g., in an SVM model) for the same data.

FIGS. 8-11 are screen diagrams illustrating example information included in a risk and/or action model that may be output for display, in accordance with one or more aspects of the present disclosure. The analyses performed by risk analysis module 10 and rule-based/machine learning engine 6 may be integrated into a risk model and/or action model, such as represented in one or more of FIGS. 8-11, which may be output for display by graphical user interface module 8, in order to provide a graphical representation of potential vulnerabilities within context of execution of applications executing on target computing systems 20. In various examples, the risk and/or action model may comprise a hierarchical risk model that represents a tree (e.g., an attack and/or game tree). In these examples, the results from rule-based/machine learning engine 6, as well as the structure of the risk model used by risk analysis module 10, may be stored in a particular format, such as an eXtensible Markup Language (XML) format. Such a file format is extensible and allows for the addition of arbitrary computed attributes and other data to be stored with each node in the model.

The hierarchical risk modeling and automated evaluation technologies may be provided by risk analysis module 10. In various non-limiting examples, risk analysis module 10 may model risks using a version of attack trees, which are created to support systematic investigation of attack modalities. In some other non-limiting examples, risk analysis module 10 may use constructive tree models. Constructive trees show how various important/desirable properties represented in the trees are maintained. These models then breaks down each property into sub-properties that must all be maintained (e.g., for conjunctive nodes) or one of which may be maintained (e.g., for disjunctive nodes).

In examples where risk analysis module 10 uses attack trees, the attack trees may represent an attack (e.g., benign or malicious attack) that is performed on a target computing system (e.g., target computing system 20A) during execution of one or more applications (e.g., applications 66) on that system. A top-level attack goal, such as modifying stored data, is represented at the root node of such an attack tree. Each level below the root node may comprise various sub-nodes (or leaf nodes), and each sub-node may have one or more further respective sub-nodes. Each sub-node represents an attack sub-goal of goal that is represented by its respective root or parent node. In the particular example above, where the top-level attack goal is represented in the attack tree as modifying stored data of target computing system 20A during execution of applications 66, the attack sub-goals, represented by the sub-nodes of the root node of the attack tree, may be modifying the data during computation or modifying the data in storage.

For instance, as shown in the example of FIG. 8, an illustrated attack tree represents a tree structure for an attacker's goals and methods with respect to one or more attacks against a target computing system, such as target computing system 20A. The attack tree, illustrated in area 120 of the graphical user interface of FIG. 8, may include five distinct higher-level nodes that each represent a respective higher-level goal of an attack. In some cases, the five higher-level nodes may each comprise a top-level node (e.g., root nodes), but in other cases, they may represent sub-nodes of an even higher-level root node representing a highest-level goal of the attack (not shown).

The five higher-level nodes in the attack tree of FIG. 8 represent the following five higher-level attack goals: breach confidentiality of the runtime system, compromise integrity of the runtime system, reduce availability of the runtime system, misuse services of the runtime system, and force compliance or increase liability with respect to the runtime system. In addition, FIG. 8 illustrates examples sub-goals of certain ones of these higher-level goals. For example, the node of the attack tree representing the goal of breaching confidentiality has four sub-nodes that represent the following respective sub-goals: read private information in transit, read private data at rest or a specific computer or device, convince a human to directly reveal private information, and deduce private data be reading public data. In addition, the node of the attack tree representing the goal of compromising integrity has three sub-nodes that represent the following respective sub-goals: modify private information in transit, modify private data at rest on a specific computer or device, and convince a human to directly modify private information. As shown, the higher-level goals may share one or more common sub-goals, which may, in some examples, be represented by common sub-nodes in the overall attack tree.

Sub-goals may be disjunctive (e.g., one of the sub-goals must be met) or conjunctive (e.g., all sub-goals must be met) in order for the parent goal (e.g., top-level attack goal) to be satisfied. In some cases, other criteria with respect to the sub-goals must be satisfied in order for the parent goal to be satisfied. For example, depending on the criteria, the parent goal may be satisfied if none of the sub-goals are met, if at least two of the sub-goals are met, or if all of the sub-goals are met in a particular (e.g., chronological) order, to name only a few examples.

Leaf sub-goals are those that might be met because of a vulnerability in the system. For example, an attacker might insert a known-weak encryption algorithm, allowing an adversary to easily decode encrypted data in transit. Therefore, the attack tree represents how vulnerabilities (e.g., vulnerabilities based on execution of malware) can be exploited to achieve the attacker's possible aims on a target computing system (e.g., target computing system 20A).

As further shown in the non-limiting example of FIG. 8, the graphical user interface, in addition to displaying the details of the attack tree, may also display additional details, as shown on the right-hand side of the graphical user interface, in area 122 of FIG. 8. For example, various additional goal details may be provided for any of the nodes in the attack tree. In FIG. 8, the user has selected the sub-node (or leaf node) representing the sub-goal of convincing a human to directly reveal private information, which occurs under the parent node representing the goal to breach confidentiality. This selected sub-node is highlighted in the attack tree in area 120 of FIG. 8. On the right-hand side of FIG. 8, the name of this sub-goal is shown, and any available and additional description or documentation may be provided with respect to the selected goal, although none are shown in the example of FIG. 8.

The graphical user interface may also include further details regarding testing procedures that may be performed in the portion of area 122 labeled "Testing Procedures," although none are shown in the example of FIG. 8. These testing procedures may include procedures for determining or evaluating whether the particular goal or sub-goal of the attack has been prevented. The passing of tests that are included in the testing procedure may indicate that the respective goal or sub-goal of the attack cannot take place. In certain examples, the tests included in these testing procedures may include one or more tests that are initiated by agents/test modules 12 of network security and threat assessment system 2 when obtaining monitoring information from one or more of target computing systems 20.

The graphical user interface may also include further details regarding attributes and computed values in the portion of area 122 in FIG. 8 labelled "Attributes and Computed Values." The attributes and computed values may include data, such as fixed or dynamic values, associated with the respective goal or sub-goal. In the particular example of FIG. 8, the two values shown relate to remediation and attack costs. The attack cost may be associated with the attacker's cost based on test results, and the remediation cost may be associated with any remediation costs for fixing one or more items based on unsuccessful attempts to prevent an attack. Another value that may be computed is a probability value, which may be a computed value associated with a probability of occurrence of a particular attack or portion of an attack (e.g., portion of goals represented in an attack tree). Thus, one or more of the values shown in this portion of the graphical user interface may be related to costs for remediating or fixing issues that arise due to attacks or associated vulnerabilities.

Risk analysis module 10 is configured to perform automated evaluations and computations on the attack trees, testing on-line to see whether particular vulnerabilities are present, and/or whether known weak configurations or libraries are in use (e.g., in system libraries 64 and/or application libraries 65). Risk analysis module 10 may compute metrics and/or costs based on component metrics. Risk analysis module 10 may analyze monitoring information provided by agents/test modules 12, which may include test results, and may also, in some cases, utilize information provided by local knowledge base 16 and/or central knowledge base 18. For example, central knowledge base 18 may include information about known or common vulnerabilities and exposures. The results of the analyses may be summarized, for example, in a dashboard that is output for display by graphical user interface module 8, which enables a user to identify and even potentially pinpoint critical risks and potentially cost-effective means to address them. In various examples, the structure of an attacker's methodologies is implicit in the attack tree model used by risk analysis module 10, allowing severity or complexity information reported by individual ones of agents/test modules 12, or for individual components, to appropriately bubble-up to top-level software assurance goals.

In the risk model output via graphical user interface module 8, risk analysis module 10 may compute aggregate risks or other statistics for one or more of the potential vulnerabilities. In certain examples, the risk model may identify potentially cost-effective places within the model (e.g., attack tree) to address such potential vulnerabilities. For instance, if an analyst assigned costs to fix or re-implement various components (e.g., components of target computing system 20A, such as applications 66), the risk model may help identify or potentially pinpoint the most cost-effective places to address such vulnerabilities (e.g., in applications 66, system libraries 64, application libraries 65) given the test results.

Figure 9:
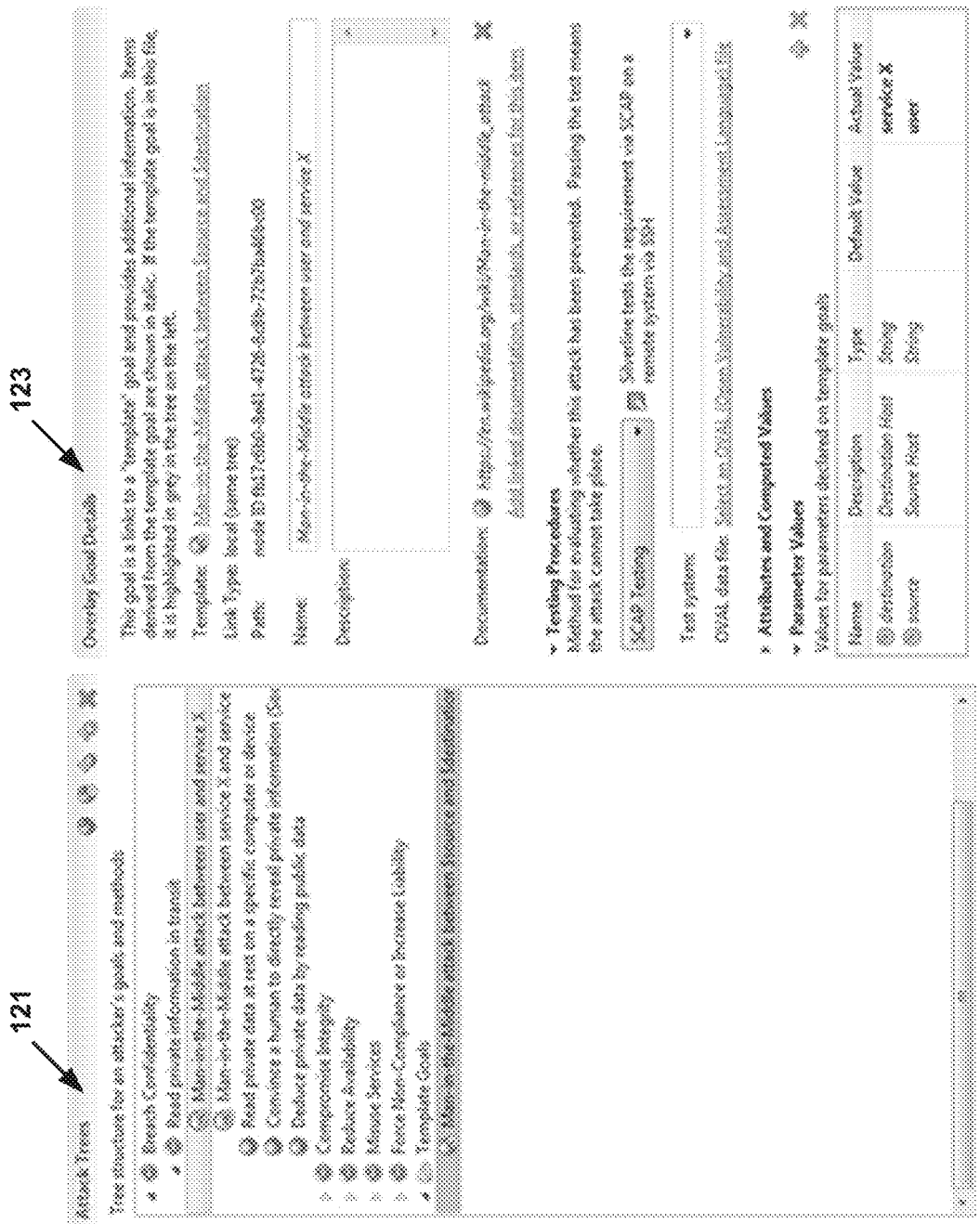

FIG. 9 illustrates another example of information associated with an attack tree with respect to one or more attacks that may be performed against a target computing system, such as target computing system 20A. A representation of an attack tree, illustrated in area 121 of the graphical user interface of FIG. 9, is similar to the one shown in FIG. 8, and may include five distinct higher-level nodes that each represent a respective higher-level goal of an attack. Area 121 also shows an example of sub-level nodes that each represent respective sub-goals of the parent goal to "Read private information in transit." These sub-goals relate to "Man-in-the-Middle attack between user and service X" and "Man-in-the-Middle attack between service X and service Y."

These sub-goals may be created dynamically by a user in some cases. However, as described previously, applications 4 may also provide template goals that may be used and reused by individuals to expedite the creation of any goals or sub-goals in an attack tree. Area 21 of FIG. 9 illustrates a user's selection of such a template goal in the creation of the sub-goals identified above. The template goal is labelled "Man-in-the-Middle attack between $source and $destination." Upon the user's selection of this template goal, the user may insert or complete the template information for "$source" and "$destination" when inserting the goal into the attack tree.

As further shown in the non-limiting example of FIG. 9, the graphical user interface, in addition to displaying the details of the attack tree, may also display additional details, as shown on the right-hand side of the graphical user interface, in area 123 of FIG. 9. For example, various additional goal details may be provided for any of the nodes in the attack tree. In FIG. 9, the user has selected the sub-node (or leaf node) representing the sub-goal of "Man-in-the-Middle attack between user and service X," as highlighted in the attack tree in area 121. On the right-hand side of FIG. 9, the name of this sub-goal is shown, and any available and additional description or documentation may be provided with respect to the selected goal, including template information.

The graphical user interface may also include further details regarding testing procedures that may be performed in the portion of area 123 labeled "Testing Procedures." These testing procedures may include procedures for determining or evaluating whether the particular goal or sub-goal of the attack has been prevented. The passing of tests that are included in the testing procedure may indicate that the respective goal or sub-goal of the attack cannot take place. In certain examples, the tests included in these testing procedures may include one or more tests that are initiated by agents/test modules 12. In the particular non-limiting example of FIG. 9, the user has selected "SCAP Testing" to test the requirement of this particular sub-node/sub-goal via SCAP (Security Content Automation Protocol) on a remote, target system via SSH. Although none is shown as selected in FIG. 9, the user may select the test or target system on which to perform the test, and the user may also select an OVAL (Open Vulnerability and Assessment Language) data file to associate with the test.

The graphical user interface may also include further details regarding attributes and computed values in the portion of area 123 in FIG. 9 labelled "Attributes and Computed Values." The attributes and computed values may include data, such as fixed or dynamic values, associated with the respective goal or sub-goal. For example, although not shown, two such values may relate to remediation and attack costs. The attack cost may be associated with the attacker's cost based on test results, and the remediation cost may be associated with any remediation costs for fixing one or more items based on unsuccessful attempts to prevent an attack. Thus, one or more of the values shown in this portion of the graphical user interface may be related to costs for remediating or fixing issues that arise due to attacks or associated vulnerabilities.

The graphical user interface may also include further details regarding parameter values that may be associated with the template goal. FIG. 9 shows two examples of parameters: a destination host name ("$destination") and a source host name ("$source"). The users may complete the values of these parameters to complete the template for the template goal (e.g., the template goal of "Man-in-the-Middle attack between $source and $destination"), where the user has filled in the value of "service X" for "$destination", and the value of "user" for "$source".

In certain non-limiting examples, expected result sets will be used by agents/test modules 12 and/or risk analysis module 10 to constrain the set of possible system states of a target to analyze during or upon performance of one or more tests on a target system (e.g., one of target computing systems 20). Instead of using only test procedures that identify a binary result depending on an expected or unexpected result, agents/test modules 12 and/or risk analysis module 10 may enable the use of non-binary expected results. These expected result sets may be also be stored in test records 10 and may include a finite set of possible target responses, test results, or a range of values. Finite sets can also be used to define a finite set of possible system states of a target. Given enough computing potential and time, these sets can be used to identify a very large, and ultimately insightful, set of game scenarios to prepare for when using the attack tree and game tree, such as those illustrated in FIG. 4.

In certain non-limiting examples, simulation module 9 may provide features to store, organize, and replay experimental attack scenarios. Simulation module 9 may interact with graphical user interface module 8 to provide a simulation management dashboard that includes an interactive user interface. As shown in the figures and described below in reference to FIG. 10, graphical user interface module 8 may generally display visual information in a dashboard about the status of any given target through, e.g., a filterable set of test results. This dashboard, or a separate related dashboard, may manage data points that define the state of the target and how each data point impacts the overall system risk. Each state may account for the player payoffs and computed results of each possible attack, providing a quantitative measure of overall risk for each state of a target system. As a result, risk analysis module 10 may be enabled to identify and highlight problematic system states over a large and complex attack surface. Risk analysis module 10 may use the set of possible system states from each test procedure to identify the most beneficial payoffs. In some cases, applications 4, utilizing simulation module 9, may provide a system for running, managing, and storing attack simulation scenarios in order to potentially uncover high priority defensive actions. Ultimately, this may provide more exhaustive coverage of the attack surface with little to no additional management overhead.

One non-limiting example of a dashboard that shows graphical representations of potential vulnerabilities and associated scores within a hierarchical risk model, as well as possible corresponding actions, is shown in FIG. 10. In this example, a version of a tree (e.g., attack tree) having a particular tree structure for an attacker's goals with testing annotations is illustrated, where higher-level or root nodes may be associated with respective higher- or top-level or root operations (e.g., goals) associated with "Servers" and "Network Infrastructure." The lower-level sub-nodes (or leaf nodes) of the higher-level server node are associated with lower-level operations or sub-operations (e.g., sub-goals) associated with "File Storage Server," "DNS Server," "DMZ Systems," and "VoIP Server." The higher-level operations and lower-level (or sub-) operations may be associated with execution of applications on a target computing system (e.g., target computing system 20A). A user may select any given node within the tree to expand or collapse the view. For example, the user may select the "Servers" node to obtain an expanded view of the respective sub-nodes.

The tree may be highlighted or shaded based on scores that are calculated using the Common Vulnerability Scoring System (CVSS), which is a widely adopted system that is used for assigning numerical scores for potential vulnerabilities in a system based on relative severity. In the example of FIG. 10, the CVSS scores are based on lookups from the National Vulnerability Database (NVD) from the National Institute of Standards and Technology (NIST). Various information from the NVD, including information associated with Common Vulnerability and Exposure (CVE) lists or identifiers, may be accessible network security and threat assessment system 2 (e.g., via central knowledge base 18). These potential vulnerabilities may be determined based, e.g., on the determined operating state of the tested target system (e.g., target computing system 20A) from, e.g., tests that are performed on the target system. As described previously, these tests may be assigned or otherwise associated with nodes in an attack tree.

Nodes that are highlighted in the tree or otherwise graphically emphasized (e.g., having an "X" symbol located to the left of the text in a respective row, and/or otherwise highlighted) are nodes that may have corresponding, potential vulnerabilities identified with respect to a target computing system, such as target computing system 20A. Nodes that are not highlighted, or which have a checkmark symbol located to the left of the text in a respective row, do not have any associated vulnerability. In the example of FIG. 10, a high-level vulnerability has been identified for "Servers," and the following sub-level nodes also have associated vulnerabilities that are identified: "File Storage Server," "DNS Server," "DMZ Systems," and "VoIP Server." Any individual sub-level node may also include further lower-level nodes having vulnerabilities within the tree. For example, as shown in FIG. 10, the node "File Storage Server" may also include the following lower-level nodes with identified vulnerabilities: "Subversion," "Bug Tracker," and "Internal Wiki." In some examples, each vulnerability within the tree may be associated with particular failed tests that caused the respective vulnerability, and may be based on the current operating state of target computing system 20A. In some examples, a sub-node in the tree that is associated with a respective vulnerability may have one or more further sub-nodes that represent respective vulnerabilities (e.g., CVE identifiers). For example, as shown in FIG. 10, the sub-node "Bug Tracker" has further sub-nodes that identify the following specific vulnerabilities associated with "Bug Tracker": "CVE-2004-0769," "CVE-2014-8630," and "CVE-2015-4499." In such fashion, vulnerabilities may be represented in context within the tree, such that a user may more fully understand how the vulnerabilities fit in within the nodes (e.g., operations, goals) of the tree, along with the respective scores or severities of such vulnerabilities.

In the particular example of FIG. 10, the scores that may be assigned to potential vulnerabilities represented in the tree structure may be CVSS scores within the range of zero through ten, with a score of ten being associated with the most severe vulnerability. Each vulnerability, in certain examples, may comprise one of the CVE's from the list, having a particular identifier for the corresponding vulnerability. Any given CVSS score may, in various examples, be further broken down into the following vectors: (a) access complexity vector, which is a qualitative measure of the complexity of the attack; (b) access vector, which indicates whether an adversary can complete the attack from a network (e.g., the Internet), whether the attacker must be on the same local network as the target computing system, or whether the attacker must have already gained access to the target computing system by other means; (c) authentication required vector, which indicates the number of authentication credentials required to complete the attack (e.g., none, one, or multiple); (d) confidentiality impact vector, which indicates the qualitative impact on information confidentiality (e.g., complete, partial, or none); (e) integrity impact vector, which indicates the qualitative impact on information integrity (e.g., complete, partial, or none); and (f) availability impact vector, which indicates the qualitative impact on information availability (e.g., complete, partial, or none). Each vulnerability or CVE included in the tree structure may have a respective value for each of these vectors.

As noted above, the vulnerabilities that are highlighted or graphically emphasized have associated CVSS scores. In some examples, nodes with associated vulnerabilities having lower or less severe scores (e.g., scores in the range of 0.1 to 4.0) may be highlighted in a first color, such as yellow. Nodes with associated vulnerabilities having higher or more severe scores (e.g., scores in the range of 4.1 to 8.0) may be highlighted in a second color, such as orange. Nodes with associated vulnerabilities having scores that are extremely high or severe (e.g., in the range of 8.1 to 10.0) may be highlighted in a third color, such as red, to identify these vulnerabilities as the most critical to the operation of the system. A user may attempt to address the vulnerabilities in an order corresponding to the level of severity of such vulnerabilities, which may be quickly and easily identified from the tree. By analyzing the tree (e.g., in the graphical dashboard format shown in FIG. 10), a user is able to identify all potential vulnerabilities within a hierarchical format and context, such that the user may be able to understand the various risks to the operation of the target computing system, at both high and low levels, and may further obtain a better understanding as to how and prioritize corrective and/or preventive actions to mitigate the identified vulnerabilities.

As described previously, nodes within the attack tree may reference or be referenced by nodes within a game tree. Using the nodes in the attack tree that are associated with certain goals of an attack and/or with certain failed tests on target computing system 20A, risk analysis module 10 can not only identify potential vulnerabilities of target computing system 20A, but it may also identify nodes of the game tree that reference these nodes of the attack tree in order to identify one or more actions of the game tree (e.g., adversarial actions, responsive actions) that are associated with the potential security vulnerability of target computing system 20A. For example, risk analysis module 10 may identify one or more actions 41-49 of game tree 40 shown in the example of FIG. 4, or nodes 31, 33 illustrated in the example of FIG. 3, as well as any associated information and/or calculated metrics (e.g., attacker payoff, defender cost, probability of occurrence). Although not shown in FIG. 10, the graphical dashboard may also output a graphical representation of these one or more actions (e.g., in the same graphical window, in a separate window). For example, upon selection of one of the vulnerabilities represented in FIG. 10, graphical user interface module 8 may output a graphical representation of the one or more adversarial and/or responsive actions from the game tree that are associated with this particular vulnerability (e.g., based on a mapping of one or more nodes from the game tree to one or more nodes of the attack tree associated with this vulnerability). The representations of these adversarial and/or responsive actions may, e.g., be in textual and/or other graphical form.

A user may also select any of the vulnerabilities represented in FIG. 10 to obtain further details of the tests that are associated with the respective vulnerability. For each, the user may select the vulnerability of FIG. 10 named "CVE-2014-9367" to obtain further details of the test details that led to this vulnerability, which are shown in FIG. 11. The test details may indicate which test or tests were run, the time of test execution, and the overall test results (e.g., a failure of the tests, indicating that requirements were not met and that an attack is possible to cause the vulnerability, as shown in area 126 of FIG. 11). The test details may also include the exact CVSS score (e.g., score of 4.3) and the associated attributes and computed values (e.g., data and fixed or dynamic values for the goal that is associated with this vulnerability), broken down into the vector values described above (as illustrated in area 124 of FIG. 11), which may be determined based on analysis of the information collected within the risk model. For instance, the test details may indicate an "access vector" value of "network," an "access complexity" value of "medium", an "authentication required" value of "none," a "confidentiality impact" value of "none," an "integrity impact" value of "partial," and an "availability impact" value of "none."

Thus, for the vulnerability named "CVE-2014-9367," the detailed information shown in area 124 provides the CVSS score, a value associated with the access vector, a value associated the access complexity vector, a value associated with the authentication required vector, a value associated with the confidentiality impact vector, a value associated with the integrity impact vector, and a value associated with the availability impact vector. The value associated with the confidentiality impact vector indicates a qualitative impact on information confidentiality for the vulnerability named "CVE-2014-9367" shown in the attack tree of FIG. 10. The value associated with the integrity impact vector indicates the qualitative impact on information integrity for this vulnerability. In addition, the value associated with the availability impact vector indicates the qualitative impact on information availability for the vulnerability. By analyzing the collected information in the risk model, network security and threat assessment system 2 is enabled to determine one or more potential vulnerabilities (e.g., the vulnerability named "CVE-2014-9367) and one or more potential impacts (e.g., values associated with the confidentiality impact vector, the integrity impact vector, and the availability impact vector) of these vulnerabilities in a target computing system.

The example of FIG. 11 may also include one or more graphical representations of actions (e.g., adversarial actions, responsive actions) from nodes of a game tree that reference the nodes of the attack tree that are associated with one or more particular vulnerabilities. As shown at the bottom of the non-limiting example of FIG. 11, the "Incomplete blacklist vulnerability" may allow "remote attackers to conduct cross-site scripting (XSS) attacks via a """ (single quote) in the scope parameter to do/view/TWiki/WebSearch." Thus, in this example, the identified vulnerability is associated with a potential adversarial action to be performed based on the current operating state of the target computing system. This adversarial action may be represented or included in a node of a game tree that references a node of the attack tree that is associated with this potential vulnerability, where the vulnerability may be determined based on the operating state of the target system. (This node of the attack tree may also have an assigned identifier of the target system, as well as any identifiers of tests that are performed on the target system or of the agents/test modules 12 that perform these tests.)

As described previously, the dashboard shown in FIG. 10, or a separate related dashboard, may manage data points that define the state of the target and how each data point impacts the overall system risk. Each state may account for the player payoffs and computed results of each possible attack, providing a quantitative measure of overall risk for each state of a target system. Finite sets can also be used to define a finite set of possible system states of a target. Given enough computing potential and time, these sets can be used to identify a very large, and ultimately insightful, set of game scenarios to prepare for when using the attack tree and game tree, such as those illustrated in FIG. 4.

Figure 12:
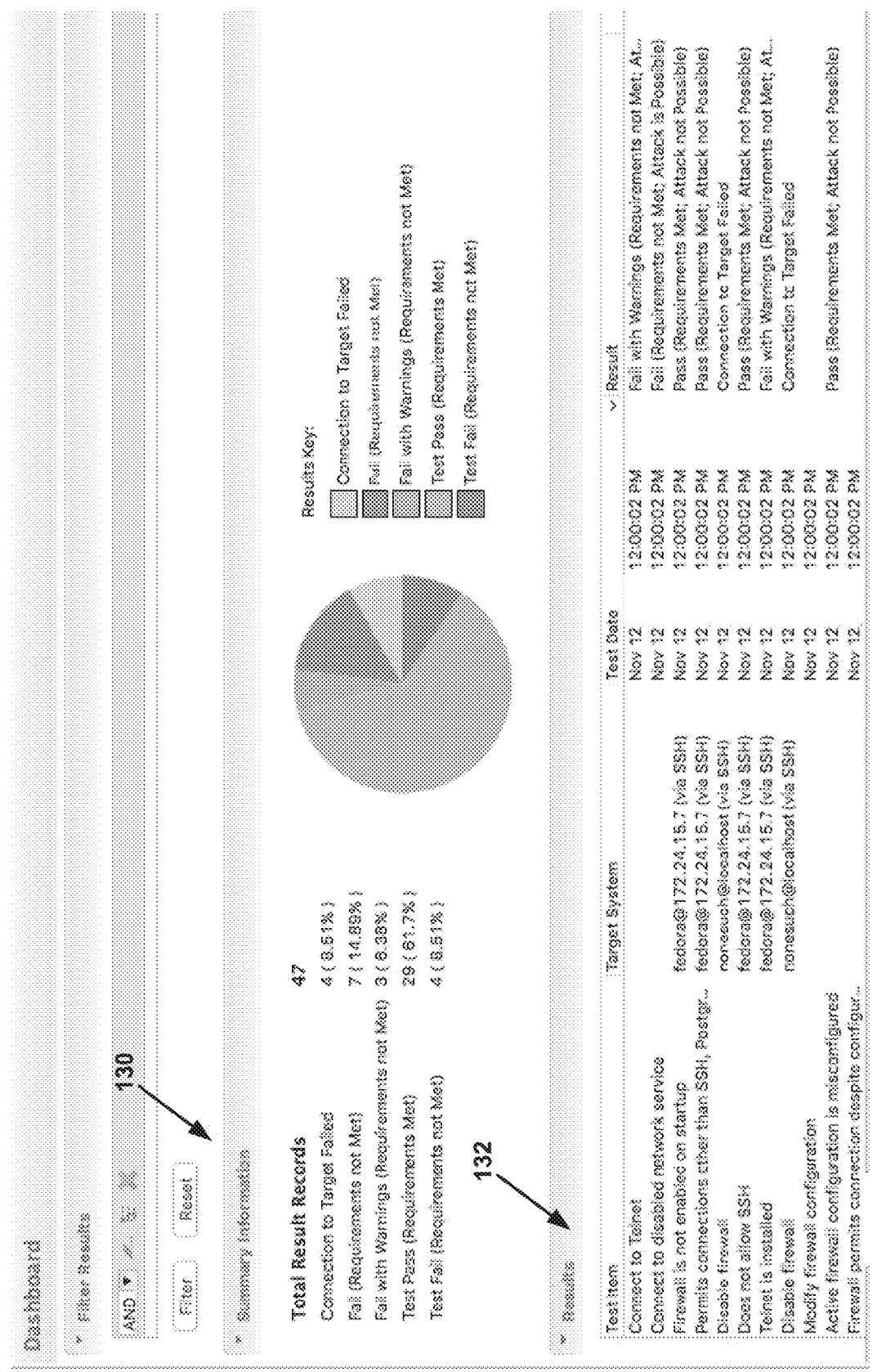

FIG. 12 is another screen diagram illustrating an example of a dashboard that may be displayed in the graphical user interface to provide summary information to the user regarding test results and potential vulnerabilities to the system. Overall summary information may be included in area 130 of the graphical user interface. The summary information may include the total result records of all tests that have been performed (e.g., by agents/test modules 12), both in numerical and chart (e.g., pie-chart) form. These results may indicate, for example, the number of tests in which the connection to the target (e.g., target computing system 20A) failed, the number of tests that failed (such that requirements of the test were not met), the number of tests that failed with warnings (such that the requirements of the test were not met), the number of tests that passed (such that requirements of the test were met), and another category of tests that failed (such that requirements were not met). For various scenarios or instances in which there was a failure, risk analysis module 10 may utilize the hierarchical model (e.g., attack tree) to identify one or more operations or sub-operations in a tree module (e.g., goals or sub-goals in an attack tree) that may be achieved in view of the failure, and to identify any corresponding vulnerabilities and associated scores in view of the failure, which may be output to the user as a group of graphical representations of such vulnerabilities (e.g., such as in the dashboard of FIG. 10).

Area 132 of the graphical user interface provides more specific tests results. Each of the test results includes a description of a test item, a name of the target system associated with the test (e.g., one of target computing systems 20), the test date, and the test results. Each of the test items may be associated with one or more of the operations or sub-operations (e.g., goals or sub-goals) in the hierarchical risk model (e.g., attack tree shown in FIG. 8 and/or FIG. 10), and may also be associated with one or more potential vulnerabilities in the model (e.g., vulnerabilities shown in FIG. 10) when the corresponding test results indicate a failure. As shown in the results column, test failures may cause the results to indicate that an attack is possible, alerting the user to possible issues with the target system(s). In some cases, the user may select one of the test items or results in area 132 to cause the graphical user interface to display or highlight one or more nodes within the tree structure (e.g., shown in FIG. 10) that correspond to the test result (e.g., failure) and associated vulnerabilities, allowing the user to identify potential vulnerabilities in the model that are associated with the test results.

Figure 13:
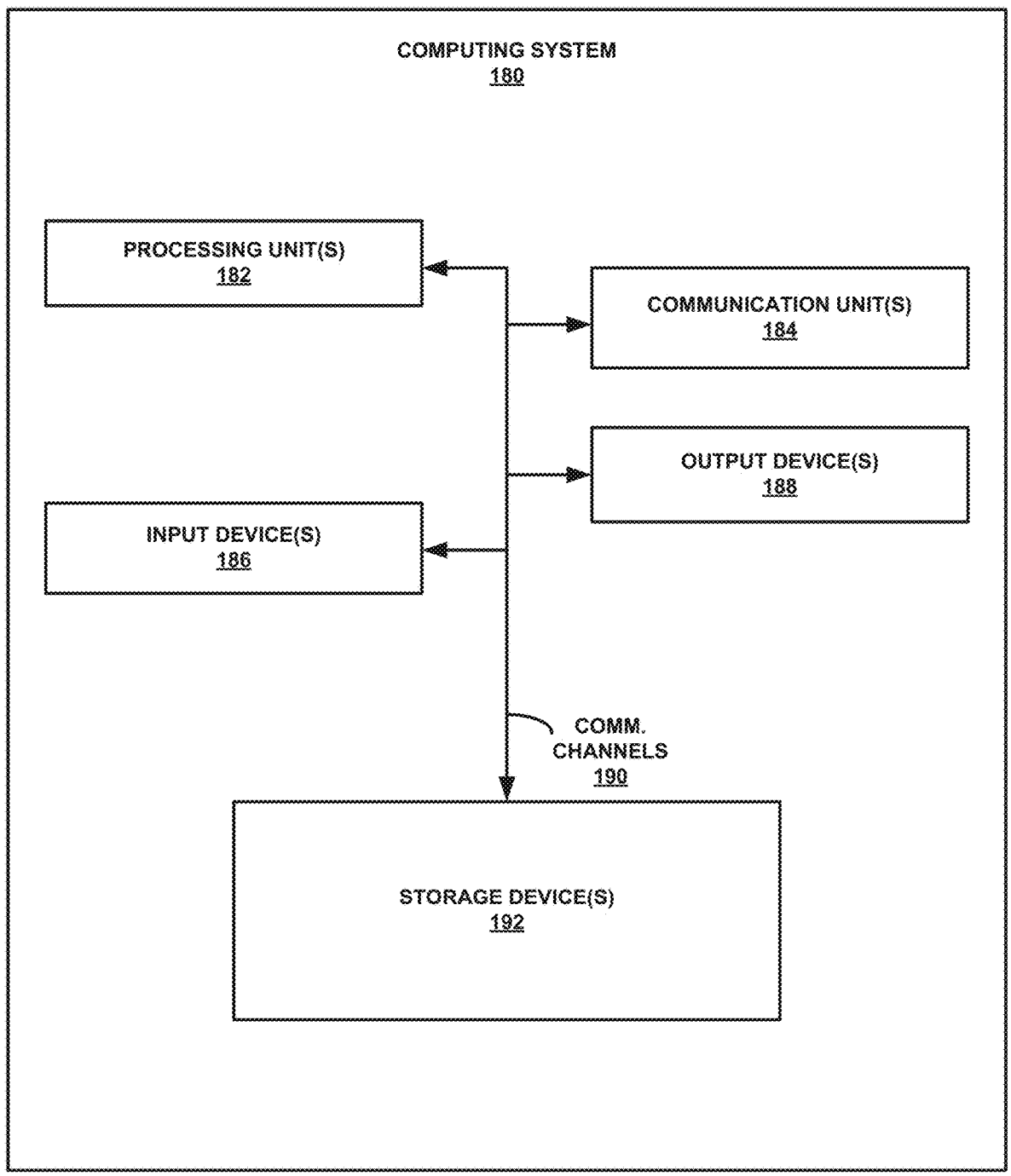
FIG. 13 is a block diagram illustrating further details of an example computing system, such as the network security and threat assessment system or one of the target computing systems shown in FIG. 1B or FIG. 5, in accordance with one or more aspects of the present disclosure.

FIG. 13 is a block diagram illustrating further details of an example computing system 160, such as network security and threat assessment system 2 (FIG. 1B) or one of target computing systems 20 (FIG. 1B), in accordance with one or more aspects of the present disclosure. FIG. 7 illustrates only one particular example of computing system 180, and many other examples of computing system 180 may be used in other instances and may include a subset of the components shown, or may include additional components not shown, in FIG. 13.

As shown in the example of FIG. 13, computing system 180 includes one or more processing units 182, one or more input devices 186, one or more communication units 184, one or more output devices 188, and one or more storage devices 192. Communication channels 190 may interconnect each of the components 182, 184, 186, 188, and 192 for inter-component communications (physically, communicatively, and/or operatively). In some examples, communication channels 190 may include a system bus, a network connection, an inter-process communication data structure, or any other method for communicating data between hardware and/or software.

One or more input devices 186 of computing system 180 may receive input. Examples of input are tactile, audio, and video input. Examples of input devices 186 include a presence-sensitive screen, touch-sensitive screen, mouse, keyboard, voice responsive system, video camera, microphone or any other type of device for detecting input from a human or machine.

One or more output devices 188 of computing system 180 may generate output. Examples of output are tactile, audio, and video output. Examples of output devices 188 include a presence-sensitive screen, sound card, video graphics adapter card, speaker, cathode ray tube (CRT) monitor, liquid crystal display (LCD), or any other type of device for generating output to a human or machine. Output devices 188 may include display devices such as cathode ray tube (CRT) monitor, liquid crystal display (LCD), or any other type of device for generating tactile, audio, and/or visual output.

One or more communication units 184 of computing system 180 may communicate with one or more other computing systems or devices via one or more networks by transmitting and/or receiving network signals on the one or more networks. Examples of communication units 184 include a network interface card (e.g. such as an Ethernet card), an optical transceiver, a radio frequency transceiver, or any other type of device that can send and/or receive information, such as through a wired or wireless network. Other examples of communication units 184 may include short wave radios, cellular data radios, wireless Ethernet network radios, as well as universal serial bus (USB) controllers.

One or more storage devices 192 within computing system 180 may store information for processing during operation of computing system 180 (e.g., computing system 180 may store data accessed by one or more modules, processes, applications, or the like during execution at computing system 180). In some examples, storage devices 192 on computing system 180 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 192 may include redundant array of independent disks (RAID) configurations and one or more solid-state drives (SSD's).

Storage devices 192, in some examples, also include one or more computer-readable storage media. Storage devices 192 may be configured to store larger amounts of information than volatile memory. Storage devices 192 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 192 may store program instructions and/or data associated with one or more software/firmware elements or modules.

For example, when computing system 180 comprises an example of network security and threat assessment system 2 shown in FIG. 1B, storage devices 192 may store local knowledge base 16, models 13, agent-target data 15, agent-model data 17, and test records 19. In addition, storage devices 192 may store instructions and/or data associated with applications 4, including rule-based/machine learning engine 6, graphical user interface module 8, risk analysis module 10, agents/test modules 12, simulation module 9, predictive move module 11, and import/export module 14, shown in FIG. 1B. With respect to agents/test modules 12 shown in FIG. 5, storage devices 192 may store instructions and/or data associated with static analysis tools 30, system state monitors 32, active monitors 34, platform configuration test modules 36, and external probes 38. With respect to rule-based/machine learning engine 6 shown in FIG. 7, storage devices 192 may store instructions and/or data associated with rules engine 100 and machine learning engine 102. Storage devices 192 may also store policies 104 and models/attributes 106.

In other examples, when computing system 180 comprises an example of one or more of target computing system 20 (e.g., target computing system 20A), storage devices 192 may store instructions and/or data associated with operating systems 60 (including remote agent/command execution units 62 and system libraries 64), applications 66, and application libraries, as shown in FIG. 5. Storage devices 192 may also store instructions and/or data associated with function/API hooks 80 and function/API hooks 82.

Computing system 180 further includes one or more processing units 182 that may implement functionality and/or execute instructions within computing system 180. For example, processing units 182 may receive and execute instructions stored by storage devices 192 that execute the functionality of the elements and/or modules described herein. These instructions executed by processing units 182 may cause computing system 180 to store information within storage devices 192 during program execution. Processing units 182 may also execute instructions of an operating system to perform one or more operations described herein. In those examples in which computing system 180 comprises one or more of target computing systems 20, processing units 182 may comprise an example of one or more of hardware and/or virtual components 70 shown in FIG. 5 (e.g., one or more GPU's, one or more FPGA's, one or more virtual components).

Figure 14:
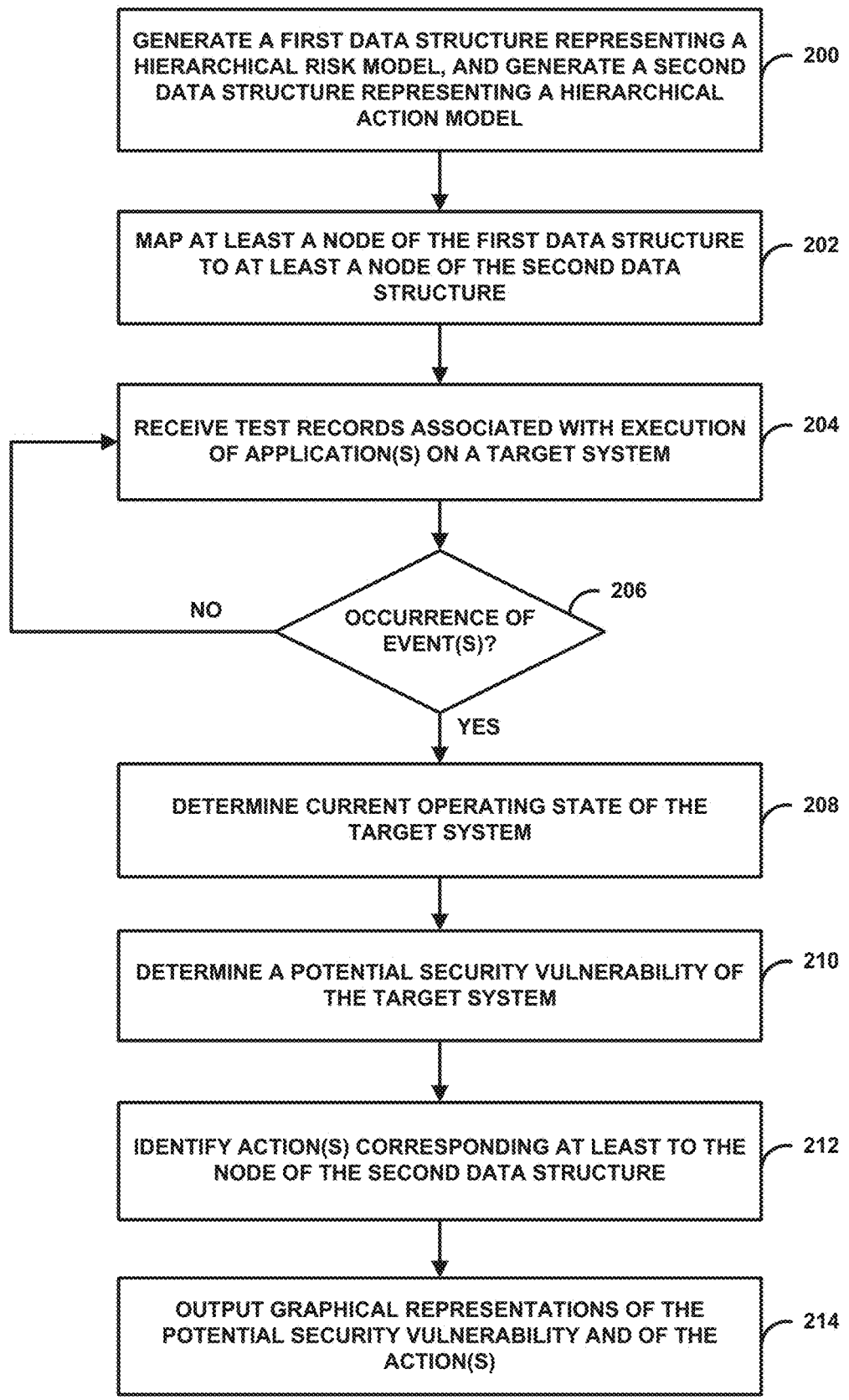
FIG. 14 is a flow diagram illustrating an example process that may be performed by the network security and threat assessment system shown in FIG. 1B, in accordance with one or more aspects of the present disclosure.

FIG. 14 is a flow diagram illustrating an example process that may be performed by a computing system, in accordance with one or more aspects of the present disclosure. For example, the process illustrated in FIG. 14, which may comprise one or more operations, may be performed by network security and threat assessment system 2 (FIGS. 1A and/or 1B).

As illustrated in FIG. 14, the process may include network security and threat assessment system 2 (e.g., using one or more of applications 4 executing on network security and threat assessment system 2, such as one or more of risk analysis module 10, rule-based/machine learning engine 6, predictive move module 11, and/or simulation module 9) performing actions to generate (200) a first computer-readable data structure representing a hierarchical risk model (e.g., attack tree), where the first computer-readable data structure includes nodes that each correspond to one or more events that may occur during execution of one or more applications on a target computing system (e.g., target computing system 20A). Network security and threat assessment system 2 may also generate a second computer-readable data structure representing a hierarchical action model (e.g., hierarchical game tree model), where the second computer-readable data structure includes nodes that each correspond to one or more actions, and where the one or more actions are associated with one or more potential security vulnerabilities of target computing system 20A during execution of the one or more applications. Network security and threat assessment system 2 may store the first and second computer-readable data structures (e.g., in storage devices 192 shown in FIG. 13). The following description of FIG. 14 refers to target computing system 20A as the example target computing system. However, any of target computing systems 20 may be used in different examples.

Network security and threat assessment system 2 may map (202) at least a node of the first computer-readable data structure that represents the hierarchical risk model to at least a node of the second computer-readable data structure that represents the hierarchical action model. Network security and threat assessment system 2 may receive (204) test records of one or more tests associated with execution of the one or more applications on target computing system 20A, such as tests that are configured by agents/test modules 12 for implementation on target computing system 20A. The test records are assigned to at least the node of the first computer-readable data structure.

If network security and threat assessment system 2 does not determine, based on the test records, that the one or more events corresponding to at least the node of the first computer-readable data structure have occurred ("NO" branch of 206), network security and threat assessment system 2 may continue to receive (204) further test records associated with execution of the one or more applications on target computing system 20A. However, responsive to determining, based on the test records, that the one or more events corresponding to at least the node of the first computer-readable data structure have occurred ("YES" branch of 206), network security and threat assessment system 2 may determine (208), based on the test records, a current operating state of target computing system 20A, and determine (210), based on the hierarchical risk model and the current operating state of target computing system 20A, a potential security vulnerability of target computing system 20A.

Network security and threat assessment system 2 may also identify (212) the one or more actions that correspond to at least the node of the second computer-readable data structure and that are associated with the potential security vulnerability of target computing system 20A. As a result, network security and threat assessment system 2 may (e.g., using graphical user interface module 8) also output (214), for display in a graphical user interface, a graphical representation of the potential vulnerability of target computing system 20A and a graphical representation of the one or more actions that are associated with the potential security vulnerability of target computing system 20A.

In some examples, network security and threat assessment system 2 may determine the potential security vulnerability of target computing system 20A at least by evaluating, based on the current operating state of target computing system 20A, the test records assigned at least to the node of the first computer-readable data structure to identify the potential security vulnerability of target computing system 20A and a severity of the potential security vulnerability. Network security and threat assessment system 2 (e.g., using graphical user interface module 8) may output the graphical representation of the potential security vulnerability at least by graphically emphasizing a representation of at least the node of the first computer-readable data structure based on the severity of the potential security vulnerability.

In some examples, the hierarchical risk model comprises an attack tree. The node of the first computer-readable data structure may comprise one of a root node of the first computer-readable data structure or a sub-node of the root node of the first computer-readable data structure, where the root node of the first computer-readable data structure represents at least one higher-level attack goal of one or more attacks performed during execution of the one or more applications on target computing system 20A. In these examples, the sub-node of the first computer-readable data structure represents a respective lower-level attack sub-goal of the one or more attacks. In these examples, the one or more attacks comprise one or more simulated attacks. Network security and threat assessment system 2 may store one or more simulated attack scenarios, and initiate, based on the one or more simulated attack scenarios, the one or more simulated attacks against target computing system 20A during execution of the one or more applications. The one or more simulated attacks are associated at least with the node of the first computer-readable data structure.

In some examples, the hierarchical action model comprises a game tree. The node of the second computer-readable data structure comprises one of root node of the second computer-readable data structure or a sub-node of the root node of the second computer-readable data structure. The root node of the second computer-readable data structure represents one or more adversarial actions that may be performed against target computing system 20A based on the potential security vulnerability of target computing system 20A. The sub-node of the second computer-readable data structure represents one or more responsive actions that may be performed on target computing system 20A to address the one or more adversary actions. In these examples, the node of the second computer-readable data structure comprises the root node of the second computer-readable data structure. Network security and threat assessment system 2 may identify the one or more actions that correspond at least to the node of the second computer-readable data structure at least by predicting, based on the current operating state of target computing system 20A, the one or more adversary actions that may be performed against target computing system 20A based on the potential security vulnerability of target computing system 20A. Network security and threat assessment system 2 (e.g., using graphical user interface module 8) may output the graphical representation of the one or more actions at least by outputting a graphical representation of the one or more adversary actions that may be performed against target computing system 20A based on the potential security vulnerability of target computing system 20A.

In these examples, the node of the second computer-readable data structure comprises the sub-node of the second computer-readable data structure. Network security and threat assessment system 2 may identify the one or more actions that correspond at least to the node of the second computer-readable data structure at least by predicting, based on the current operating state of target computing system 20A and on the one or more adversary actions, the one or more responsive actions that may be performed on target computing system 20A to address the one or more adversary actions. Network security and threat assessment system 2 (e.g., using graphical user interface module 8) output the graphical representation of the one or more actions at least by outputting a graphical representation of the one or more responsive actions that may be performed on target computing system 20A to address the one or more adversary actions.

In some examples, the test records comprise one or more test results. Network security and threat assessment system 2 may determine the current operating state of target computing system 20A at least by comparing the one or more test results to a finite set of possible test results, and determining, based on the comparison, the current operating state of target computing system 20A from a finite set of possible operating states.

In some examples, network security and threat assessment system 2 may assign an identifier of an automated test agent at least to the node of the first computer-readable data structure. The automated test agent is configured to perform the one or more tests on target computing system 20A and to provide the test records to network security and threat assessment system 2 during execution of the one or more applications. In these examples, network security and threat assessment system 2 may assign an identifier of target computing system 20A at least to the node of the first computer-readable data structure. The identifier of target computing system 20A is associated with the identifier of the automated test agent configured to perform the one or more tests on target computing system 20A.

In some examples, network security and threat assessment system 2 may determine that the one or more events corresponding at least to the node of the first computer-readable data structure have occurred by at least one or more of: determining, based on the test records, a failure of at least one of the one or more tests performed during execution of the one or more applications on target computing system 20A; or determining, based on the test records, a non-performance of at least one of the one or more tests during execution of the one or more applications on target computing system 20A.

In some examples, network security and threat assessment system 2 may determine the potential security vulnerability of target computing system 20 at least by utilizing one or more machine learning models to identify a likelihood of occurrence of the potential security vulnerability associated with execution of the one or more applications on target computing system 20A. The one or more machine learning models are trained based on prior execution of other applications on target computing system 20A.

In some examples, the potential security vulnerability of target computing system 20A may be one or more of (1) a vulnerability of information confidentiality during execution of the one or more applications on target computing system 20A, (2) a vulnerability of information integrity during execution of the one or more applications on target computing system 20A, or (3) a vulnerability of information availability during execution of the one or more applications on target computing system 20A.

In some examples, network security and threat assessment system 2 and/or target computing system 20A comprise one or more virtual systems. In some cases, network security and threat assessment system 2 is different from target computing system 20A.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, read-only memory (ROM), EEPROM, compact disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), microprocessors (e.g., general-purpose microprocessors), microcontrollers, application specific integrated circuits (ASIC's), FPGA's, or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of IC's (e.g., a chip set). In some examples, techniques of this disclosure may be performed by processing circuitry, such as one or more microprocessors, microcontrollers, or other types of circuits. In some examples, the processing circuitry reads instructions from a computer-readable storage medium (e.g., memory) and executes the instructions, causing the processing circuitry to perform various actions. In some examples, various actions are hardwired into the processing circuitry. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A system comprising:
   a target computing system; and
   a network security and threat assessment system comprising:
      one or more processors; and
      a non-transitory computer-readable storage medium storing a first computer-readable data structure and a second computer-readable data structure, wherein the first computer-readable data structure represents a hierarchical risk model and includes a plurality of nodes corresponding to events that may occur during execution of one or more applications on the target computing system, wherein the second computer-readable data structure represents a hierarchical game tree model and includes a plurality of nodes corresponding to actions that are associated with at least one potential security vulnerability of the target computing system,
   wherein the one or more processors of the network security and threat assessment system are configured to:
      determine, based on one or more events that have occurred during execution of the one or more applications, a potential security vulnerability of the target computing system, wherein the one or more events correspond to a node represented in the hierarchical risk model;
      identify, based on a mapping of the node represented in the hierarchical risk model to a node represented in the hierarchical game tree model, one or more actions that are associated with the potential security vulnerability and that correspond to the node represented in the hierarchical game tree model; and
      output, for display in a graphical user interface, a graphical representation of the potential security vulnerability and the one or more actions associated with the potential security vulnerability.

2. The system of claim 1, wherein the one or more processors of the network security and threat assessment system are further configured to:
   receive test records of one or more tests associated with execution of the one or more applications on the target computing system, wherein the test records are assigned to the node represented in the hierarchical risk model;
   responsive to determining, based on the test records, that the one or more events corresponding to the node represented in the hierarchical risk model have occurred:
      determine, based on the test records, a current operating state of the target computing system; and
      determine, based on the hierarchical risk model and the current operating state of the target computing system, the potential security vulnerability of the target computing system.

3. The system of claim 2,
   wherein the one or more processors of the network security and threat assessment system are configured to determine the potential security vulnerability of the target computing system at least by evaluating, based on the current operating state of the target computing system, the test records assigned to the node represented in the hierarchical risk model to identify the potential security vulnerability of the target computing system and a severity of the potential security vulnerability, and wherein the one or more processors of the network security and threat assessment system are configured to output the graphical representation of the potential security vulnerability at least by graphically emphasizing a representation of the node represented in the hierarchical risk model based on the severity of the potential security vulnerability.

4. The system of claim 2, wherein the test records comprise one or more test results, and wherein the one or more processors of the network security and threat assessment system are configured to determine the current operating state of the target computing system at least by being configured to:
  compare the one or more test results to a finite set of possible test results; and
  determine, based on the comparison, the current operating state of the target computing system from a finite set of possible operating states.

5. The system of claim 2, wherein the one or more processors of the network security and threat assessment system are further configured to:
  output a graphical representation of the test records that indicate an occurrence of the one or more events corresponding to the node represented in the hierarchical risk model.

6. The system of claim 2, wherein the one or more processors of the network security and threat assessment system are further configured to:
  assign an identifier of an automated test agent to the node represented in the hierarchical risk model, wherein the automated test agent is configured to perform the one or more tests on the target computing system and to provide the test records to the network security and threat assessment system during execution of the one or more applications.

7. The system of claim 6, wherein the one or more processors of the network security and threat assessment system are further configured to:
  assign an identifier of the target computing system to the node represented in the hierarchical risk model,
  wherein the identifier of the target computing system is associated with the identifier of the automated test agent configured to perform the one or more tests on the target computing system.

8. The system of claim 1, wherein the hierarchical risk model comprises an attack tree, wherein the node represented in the hierarchical risk model comprises one of a root node or a sub-node of the root node, wherein the root node represents at least one higher-level attack goal of one or more attacks performed during execution of the one or more applications on the target computing system, and wherein the sub-node represents a respective lower-level attack sub-goal of the one or more attacks.

9. The system of claim 8, wherein the one or more attacks comprise one or more simulated attacks, and wherein the one or more processors of the network security and threat assessment system are further configured to:
  store one or more simulated attack scenarios; and
  initiate, based on the one or more simulated attack scenarios, the one or more simulated attacks against the target computing system during execution of the one or more applications, wherein the one or more simulated attacks are associated with the node represented in the hierarchical risk model.

10. The system of claim 1, wherein the node represented in the hierarchical game tree model comprises one of root node or a sub-node of the root node, wherein the root node represents one or more adversarial actions that may be performed against the target computing system based on the potential security vulnerability of the target computing system, and wherein the sub-node represents one or more responsive actions that may be performed on the target computing system to address the one or more adversary actions.

11. The system of claim 10, wherein the node represented in the hierarchical game tree model comprises the root node, wherein the one or more processors of the network security and threat assessment system are configured to identify the one or more actions that correspond to the node represented in the hierarchical game tree model by being configured to predict, based on the current operating state of the target computing system, the one or more adversary actions that may be performed against the target computing system based on the potential security vulnerability of the target computing system, and wherein the one or more processors of the network security and threat assessment system are configured to output the graphical representation of the one or more actions by being configured to output a graphical representation of the one or more adversary actions that may be performed against the target computing system based on the potential security vulnerability of the target computing system.

12. The system of claim 11, wherein the node represented in the hierarchical game tree model comprises the sub-node, wherein the one or more processors of the network security and threat assessment system are configured to identify the one or more actions that correspond to the node represented in the hierarchical game tree model by being configured to predict, based on the current operating state of the target computing system and on the one or more adversary actions, the one or more responsive actions that may be performed on the target computing system to address the one or more adversary actions, and wherein the one or more processors of the network security and threat assessment system are configured to output the graphical representation of the one or more actions by being configured to output a graphical representation of the one or more responsive actions that may be performed on the target computing system to address the one or more adversary actions.

13. The system of claim 1, wherein the potential security vulnerability of the target computing system comprises at least one of (1) a vulnerability of information confidentiality during execution of the one or more applications on the target computing system, (2) a vulnerability of information integrity during execution of the one or more applications on the target computing system, or (3) a vulnerability of information availability during execution of the one or more applications on the target computing system.

14. The system of claim 1, wherein the network security and threat assessment system and the target computing system comprise one or more virtual systems.

15. The system of claim 1, wherein the network security and threat assessment system is different from the target computing system.

16. A method comprising:
  generating, by a network security and threat assessment system comprising one or more processors, a first computer-readable data structure representing a hierarchical risk model,
    wherein the first computer-readable data structure includes a plurality of nodes that each correspond to one or more events that may occur during execution of one or more applications on a target computing system;
  generating, by the network security and threat assessment system, a second computer-readable data structure representing a hierarchical action model, wherein the second computer-readable data structure includes a plurality of nodes that each correspond to one or more actions, and wherein the one or more actions are associated with one or more potential security vulnerabilities of the target computing system during execution of the one or more applications;
  mapping, by the network security and threat assessment system, at least a node of the first computer-readable data structure that represents the hierarchical risk model to at least a node of the second computer-readable data structure that represents the hierarchical action model;
  receiving, by the network security and threat assessment system, test records of one or more tests associated with execution of the one or more applications on the target computing system, wherein the test records are assigned at least to the node of the first computer-readable data structure; and
  responsive to determining, based on the test records, that the one or more events corresponding at least to the node of the first computer-readable data structure have occurred:
    determining, by the network security and threat assessment system and based on the test records, a current operating state of the target computing system;
    determining, by the network security and threat assessment system, based on the hierarchical risk model and the current operating state of the target computing system, a potential security vulnerability of the target computing system;
    identifying, by the network security and threat assessment system, the one or more actions that correspond at least to the node of the second computer-readable data structure and that are associated with the potential security vulnerability of the target computing system; and
    outputting, by the network security and threat assessment system and for display in a graphical user interface, a graphical representation of the potential security vulnerability of the target computing system and a graphical representation of the one or more actions that are associated with the potential security vulnerability of the target computing system.

17. The method of claim 16,
  wherein determining the potential security vulnerability of the target computing system comprises evaluating, based on the current operating state of the target computing system, the test records assigned at least to the node of the first computer-readable data structure to identify the potential security vulnerability of the target computing system and a severity of the potential security vulnerability, and
  wherein outputting the graphical representation of the potential security vulnerability comprises graphically emphasizing a representation of at least the node of the first computer-readable data structure based on the severity of the potential security vulnerability.

18. The method of claim 16,
  wherein the hierarchical risk model comprises an attack tree,
  wherein the node of the first computer-readable data structure comprises one of a root node of the first computer-readable data structure or a sub-node of the root node of the first computer-readable data structure,
  wherein the root node of the first computer-readable data structure represents at least one higher-level attack goal of one or more attacks performed during execution of the one or more applications on the target computing system, and
  wherein the sub-node of the first computer-readable data structure represents a respective lower-level attack sub-goal of the one or more attacks.

19. The method of claim 18, wherein the one or more attacks comprise one or more simulated attacks, and wherein the method further comprises:
  storing, by the network security and threat assessment system, one or more simulated attack scenarios; and
  initiating, by the network security and threat assessment system and based on the one or more simulated attack scenarios, the one or more simulated attacks against the target computing system during execution of the one or more applications,
  wherein the one or more simulated attacks are associated at least with the node of the first computer-readable data structure.

20. The method of claim 16,
  wherein the hierarchical action model comprises a game tree,
  wherein the node of the second computer-readable data structure comprises one of root node of the second computer-readable data structure or a sub-node of the root node of the second computer-readable data structure,
  wherein the root node of the second computer-readable data structure represents one or more adversarial actions that may be performed against the target computing system based on the potential security vulnerability of the target computing system, and
  wherein the sub-node of the second computer-readable data structure represents one or more responsive actions that may be performed on the target computing system to address the one or more adversary actions.

21. The method of claim 20,
  wherein the node of the second computer-readable data structure comprises the root node of the second computer-readable data structure,
  wherein identifying the one or more actions that correspond at least to the node of the second computer-readable data structure comprises predicting, based on the current operating state of the target computing system, the one or more adversary actions that may be performed against the target computing system based on the potential security vulnerability of the target computing system, and wherein outputting the graphical representation of the one or more actions comprises outputting a graphical representation of the one or more adversary actions that may be performed against the target computing system based on the potential security vulnerability of the target computing system.

22. The method of claim 21,
wherein the node of the second computer-readable data structure comprises the sub-node of the second computer-readable data structure,
wherein identifying the one or more actions that correspond at least to the node of the second computer-readable data structure further comprises predicting, based on the current operating state of the target computing system and on the one or more adversary actions, the one or more responsive actions that may be performed on the target computing system to address the one or more adversary actions, and
wherein outputting the graphical representation of the one or more actions further comprises outputting a graphical representation of the one or more responsive actions that may be performed on the target computing system to address the one or more adversary actions.

23. The method of claim 16,
wherein the test records comprise one or more test results, and
wherein determining the current operating state of the target computing system comprises:
comparing, by the network security and threat assessment system, the one or more test results to a finite set of possible test results; and
determining, by the network security and threat assessment system, based on the comparison, the current operating state of the target computing system from a finite set of possible operating states.

24. The method of claim 16, further comprising:
assigning, by the network security and threat assessment system, an identifier of an automated test agent at least to the node of the first computer-readable data structure, wherein the automated test agent is configured to perform the one or more tests on the target computing system and to provide the test records to the network security and threat assessment system during execution of the one or more applications.

25. The method of claim 24, further comprising:
assigning, by the network security and threat assessment system, an identifier of the target computing system at least to the node of the first computer-readable data structure,
wherein the identifier of the target computing system is associated with the identifier of the automated test agent configured to perform the one or more tests on the target computing system.

26. The method of claim 16, wherein determining that the one or more events corresponding at least to the node of the first computer-readable data structure have occurred comprises one or more of:
determining, based on the test records, a failure of at least one of the one or more tests performed during execution of the one or more applications on the target computing system; or
determining, based on the test records, a non-performance of at least one of the one or more tests during execution of the one or more applications on the target computing system.

27. The method of claim 16, wherein determining the potential security vulnerability of the target computing system comprises:
utilizing, by the network security and threat assessment system, one or more machine learning models to identify a likelihood of occurrence of the potential security vulnerability associated with execution of the one or more applications on the target computing system, wherein the one or more machine learning models are trained based on prior execution of other applications on the target computing system.

28. A non-transitory computer-readable storage medium storing instructions that, when executed, cause a computing system comprising one or more processors to perform operations comprising:
generating a first computer-readable data structure representing a hierarchical risk model, wherein the first computer-readable data structure includes a plurality of nodes that each correspond to one or more events that may occur during execution of one or more applications on a target computing system;
generating a second computer-readable data structure representing a hierarchical action model, wherein the second computer-readable data structure includes a plurality of nodes that each correspond to one or more actions, and wherein the one or more actions are associated with one or more potential security vulnerabilities of the target computing system during execution of the one or more applications;
mapping at least a node of the first computer-readable data structure that represents the hierarchical risk model to at least a node of the second computer-readable data structure that represents the hierarchical action model;
receiving test records of one or more tests associated with execution of the one or more applications on the target computing system, wherein the test records are assigned at least to the node of the first computer-readable data structure; and
responsive to determining, based on the test records, that the one or more events corresponding at least to the node of the first computer-readable data structure have occurred:
determining, based on the test records, a current operating state of the target computing system;
determining, based on the hierarchical risk model and the current operating state of the target computing system, a potential security vulnerability of the target computing system;
identifying the one or more actions that correspond at least to the node of the second computer-readable data structure and that are associated with the potential security vulnerability of the target computing system; and
outputting, for display in a graphical user interface, a graphical representation of the potential security vulnerability of the target computing system and a graphical representation of the one or more actions that are associated with the potential security vulnerability of the target computing system.

29. The non-transitory computer-readable storage medium of claim 28,
wherein determining the potential security vulnerability of the target computing system comprises evaluating, based on the current operating state of the target computing system, the test records assigned at least to the node of the first computer-readable data structure to identify the potential security vulnerability of the target computing system and a severity of the potential security vulnerability, and wherein outputting the graphical representation of the potential security vulnerability comprises graphically emphasizing a representation of at least the node of the first computer-readable data structure based on the severity of the potential security vulnerability.

30. The non-transitory computer-readable storage medium of claim 28, wherein the hierarchical action model comprises a game tree, wherein the node of the second computer-readable data structure comprises one of root node of the second computer-readable data structure or a sub-node of the root node of the second computer-readable data structure, wherein the root node of the second computer-readable data structure represents one or more adversarial actions that may be performed against the target computing system based on the potential security vulnerability of the target computing system, and wherein the sub-node of the second computer-readable data structure represents one or more responsive actions that may be performed on the target computing system to address the one or more adversary actions.

31. The non-transitory computer-readable storage medium of claim 30, wherein the node of the second computer-readable data structure comprises the root node of the second computer-readable data structure, wherein identifying the one or more actions that correspond at least to the node of the second computer-readable data structure comprises predicting, based on the current operating state of the target computing system, the one or more adversary actions that may be performed against the target computing system based on the potential security vulnerability of the target computing system, and wherein outputting the graphical representation of the one or more actions comprises outputting a graphical representation of the one or more adversary actions that may be performed against the target computing system based on the potential security vulnerability of the target computing system.

32. The non-transitory computer-readable storage medium of claim 31, wherein the node of the second computer-readable data structure comprises the sub-node of the second computer-readable data structure, wherein identifying the one or more actions that correspond at least to the node of the second computer-readable data structure further comprises predicting, based on the current operating state of the target computing system and on the one or more adversary actions, the one or more responsive actions that may be performed on the target computing system to address the one or more adversary actions, and wherein outputting the graphical representation of the one or more actions further comprises outputting a graphical representation of the one or more responsive actions that may be performed on the target computing system to address the one or more adversary actions.

* * * * *